(12) United States Patent
Tsuji et al.

(10) Patent No.: US 10,489,640 B2
(45) Date of Patent: Nov. 26, 2019

(54) DETERMINATION DEVICE AND DETERMINATION METHOD OF PERSONS INCLUDED IN IMAGING DATA

(71) Applicant: Fujitsu Limited, Kawasaki-shi, Kanagawa (JP)

(72) Inventors: Kentaro Tsuji, Kawasaki (JP); Mingxie Zheng, Kawasaki (JP); Yuji Matsuda, Kawasaki (JP); Nobuhiro Miyazaki, Kawasaki (JP); Akihiro Minagawa, Tachikawa (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/013,377

(22) Filed: Feb. 2, 2016

(65) Prior Publication Data
US 2016/0253554 A1    Sep. 1, 2016

(30) Foreign Application Priority Data
Feb. 27, 2015   (JP) .................................. 2015-039040

(51) Int. Cl.
G06K 9/00    (2006.01)
G06K 9/32    (2006.01)
G06K 9/46    (2006.01)

(52) U.S. Cl.
CPC ..... *G06K 9/00369* (2013.01); *G06K 9/00771* (2013.01); *G06K 9/3208* (2013.01); *G06K 9/4652* (2013.01); *G06K 2009/3291* (2013.01)

(58) Field of Classification Search
CPC ............ G06K 9/00369; G06K 9/3208; G06K 9/00771; G06K 2009/3291; G06K 9/4652; G06K 9/00362
See application file for complete search history.

(56) References Cited

U.S. PATENT DOCUMENTS

| | | | |
|---|---|---|---|
| 2009/0116698 A1* | 5/2009 | Zhang ................ | G06K 9/00362 382/111 |
| 2010/0215271 A1* | 8/2010 | Dariush ............. | G06K 9/00369 382/180 |

(Continued)

FOREIGN PATENT DOCUMENTS

| | | |
|---|---|---|
| JP | 2002-157599 | 5/2002 |
| JP | 2003-263641 | 9/2003 |

(Continued)

OTHER PUBLICATIONS

Ling, Haibin, and David W. Jacobs. "Shape classification using the inner-distance." IEEE transactions on pattern analysis and machine intelligence 29.2 (2007).*

(Continued)

*Primary Examiner* — Menatoallah Youssef
(74) *Attorney, Agent, or Firm* — Fujitsu Patent Center

(57) ABSTRACT

A device that determines whether a first person extracted from a first image is identified with a second person extracted from a second image, includes a processor configured to extract a first feature value of a contour portion of the first person, from the first image, extract a second feature value of a contour portion of the second person, from the second image, and determine whether the first person is identified with the second person, based on comparison processing in which a first effect on a first comparison result of the first feature value and the second feature value becomes greater than a second effect on a second comparison result of a third feature value of a portion further from a contour than the contour portion of the first person and a fourth feature value of a portion further from the contour than the contour portion of the second person.

8 Claims, 21 Drawing Sheets

(56) References Cited

U.S. PATENT DOCUMENTS

2012/0201468 A1* 8/2012 Oami .................. G06K 9/00362
382/199
2013/0044944 A1* 2/2013 Wang .................. G06F 17/3025
382/165

FOREIGN PATENT DOCUMENTS

| JP | 2007-258923 | 10/2007 |
|----|-------------|---------|
| JP | 2011-18238  | 1/2011  |
| JP | 2014-92886  | 5/2014  |
| WO | 2011/046128 | 4/2011  |

OTHER PUBLICATIONS

Gdalyahu, Yoram, and Daphna Weinshall. "Flexible syntactic matching of curves and its application to automatic hierarchical classification of silhouettes." IEEE Transactions on Pattern Analysis and Machine Intelligence21.12 (1999): 1312-1328.*

Gdalyahu, Yoram, and Daphna Weinshall. "Flexible syntactic matching of curves and its application to automatic hierarchical classification of silhouettes." IEEE Transactions on Pattern Analysis and Machine Intelligence21.12 (1999): 1312-1328. (Year: 1999).*

* cited by examiner

FIG. 4
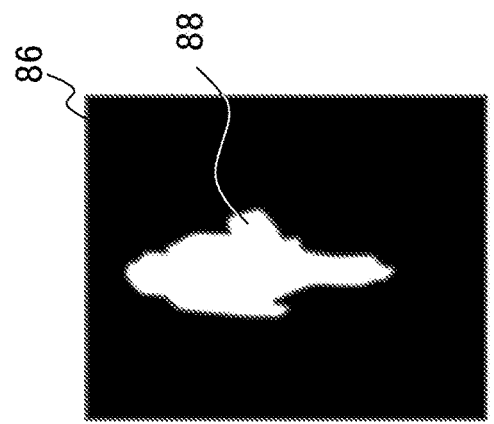
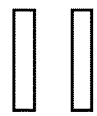
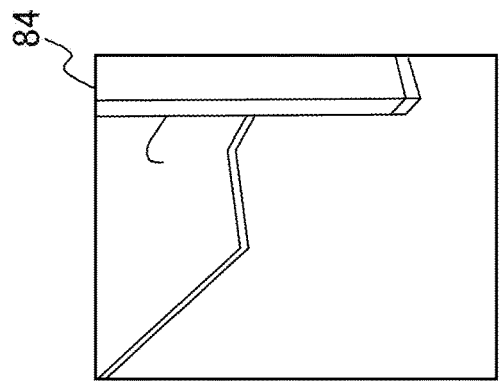
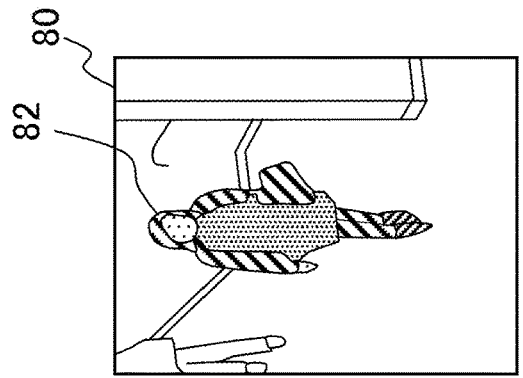

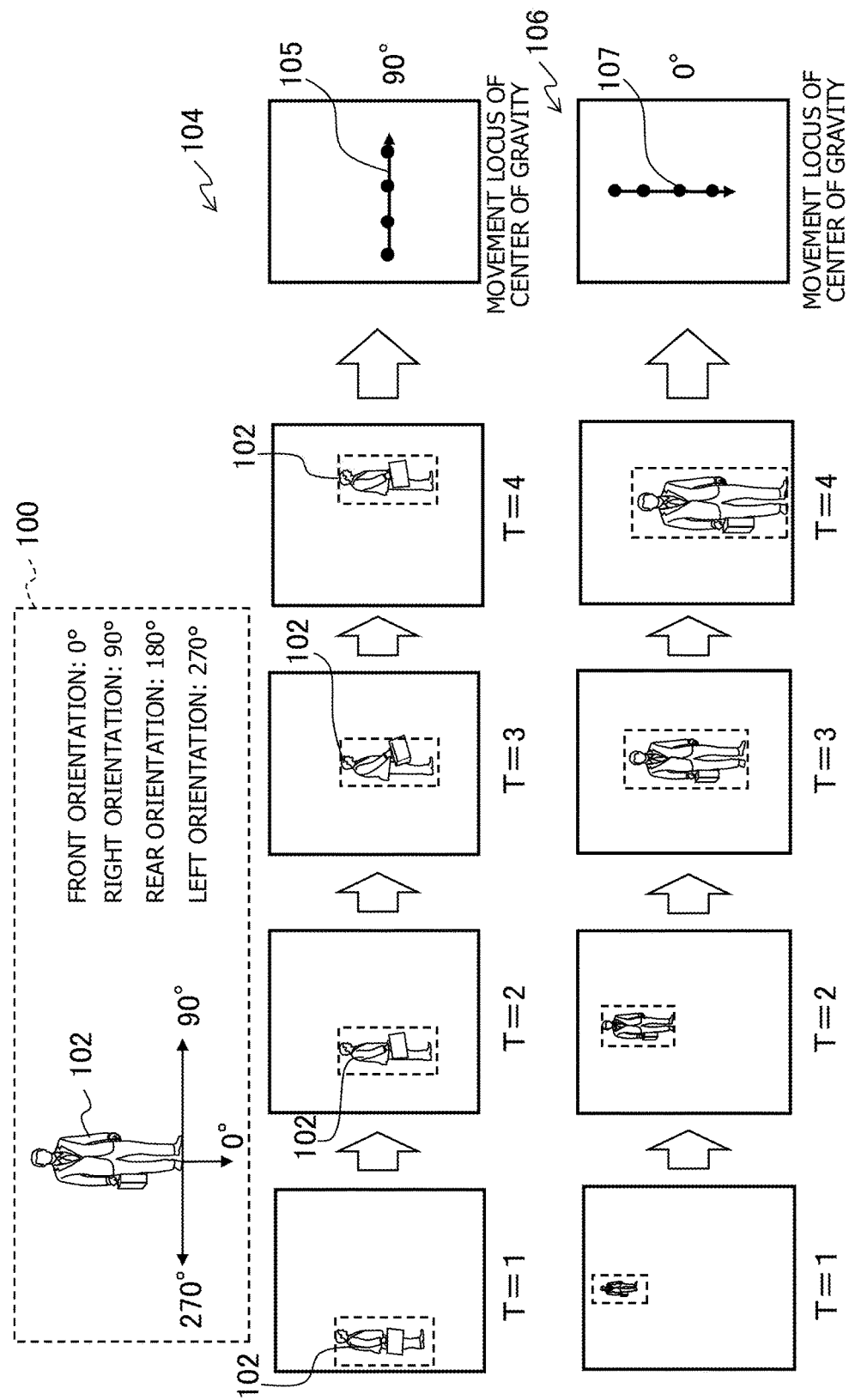

FIG. 8

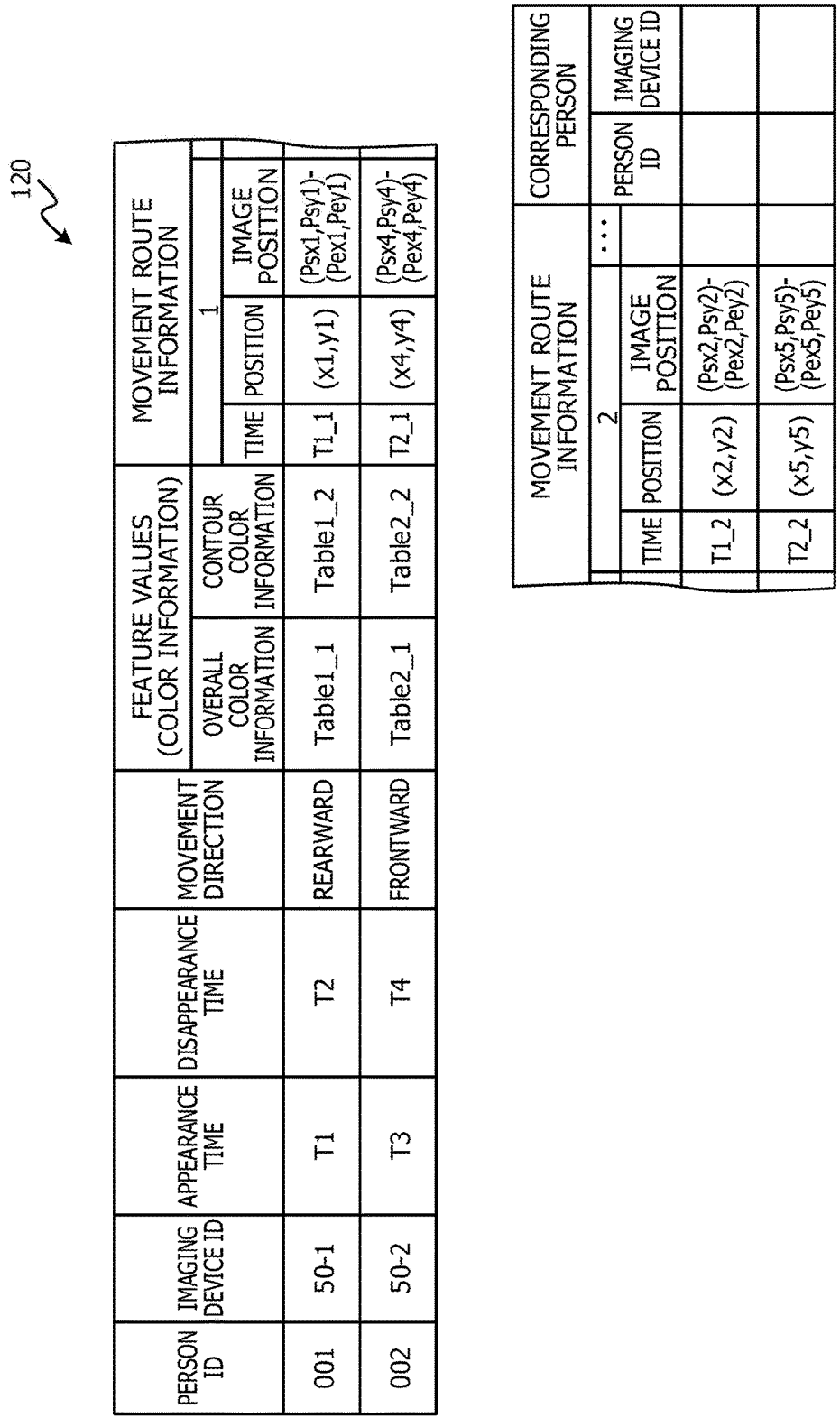

| PERSON ID | IMAGING DEVICE ID | APPEARANCE TIME | DISAPPEARANCE TIME | MOVEMENT DIRECTION | FEATURE VALUES (COLOR INFORMATION) | | MOVEMENT ROUTE INFORMATION 1 | | |
|---|---|---|---|---|---|---|---|---|---|
| | | | | | OVERALL COLOR INFORMATION | CONTOUR COLOR INFORMATION | TIME | POSITION | IMAGE POSITION |
| 001 | 50-1 | T1 | T2 | REARWARD | Table1_1 | Table1_2 | T1_1 | (x1,y1) | (Psx1,Psy1)-(Pex1,Pey1) |
| 002 | 50-2 | T3 | T4 | FRONTWARD | Table2_1 | Table2_2 | T2_1 | (x4,y4) | (Psx4,Psy4)-(Pex4,Pey4) |

| MOVEMENT ROUTE INFORMATION 2 | | | CORRESPONDING PERSON | |
|---|---|---|---|---|
| TIME | POSITION | IMAGE POSITION | PERSON ID | IMAGING DEVICE ID |
| T1_2 | (x2,y2) | (Psx2,Psy2)-(Pex2,Pey2) | | |
| T2_2 | (x5,y5) | (Psx5,Psy5)-(Pex5,Pey5) | | |

FIG. 9

| REGION (BLOCK POSITION) | | COLOR INFORMATION (R, G, B) |
|---|---|---|
| x | y | |
| 0 | 0 | (0,0,0) |
| 0 | 1 | (10,20,30) |
| 0 | 2 | (100,50,10) |
| ⋮ | ⋮ | |
| N | M | (100,100,100) |
| ⋮ | ⋮ | |

FIG. 14

| PERSON ID | IMAGING DEVICE ID | APPEARANCE TIME | DISAPPEARANCE TIME | MOVEMENT DIRECTION | FEATURE VALUES (COLOR INFORMATION) OVERALL COLOR INFORMATION | MOVEMENT ROUTE INFORMATION 1 | |
|---|---|---|---|---|---|---|---|
| | | | | | | TIME POSITION | IMAGE POSITION |
| 001 | 50-1 | T1 | T2 | REARWARD | Table1_1 | T1_1  (x1,y1) | (Psx1,Psy1)-(Pex1,Pey1) |
| 002 | 50-2 | T3 | T4 | FRONTWARD | Table2_1 | T2_1  (x4,y4) | (Psx4,Psy4)-(Pex4,Pey4) |

200

| MOVEMENT ROUTE INFORMATION 2 | | CORRESPONDING PERSON | |
|---|---|---|---|
| TIME  POSITION | IMAGE POSITION | PERSON ID | IMAGING DEVICE ID |
| T1_2  (x2,y2) | (Psx2,Psy2)-(Pex2,Pey2) | | |
| T2_2  (x5,y5) | (Psx5,Psy5)-(Pex5,Pey5) | | |

| REGION (BLOCK POSITION) | | COLOR INFORMATION (R, G, B) | DISTANCE FROM CONTOUR |
|---|---|---|---|
| x | y | | |
| 0 | 0 | (0,0,0) | 0 |
| 0 | 1 | (10,20,30) | 1 |
| 0 | 2 | (100,50,10) | 1 |
| ⋮ | ⋮ | | |
| N | M | (100,100,100) | 5 |
| ⋮ | ⋮ | | |

| PERSON ID | IMAGING DEVICE ID | APPEARANCE TIME | DISAPPEARANCE TIME | FEATURE VALUES (COLOR INFORMATION) | | | | | |
|---|---|---|---|---|---|---|---|---|---|
| | | | | 0° | | 15° | | 30° | |
| | | | | OVERALL COLOR INFORMATION | CONTOUR COLOR INFORMATION | OVERALL COLOR INFORMATION | CONTOUR COLOR INFORMATION | OVERALL COLOR INFORMATION | CONTOUR COLOR INFORMATION |
| 001 | 50-1 | T1 | T2 | Table1_1 | Table1_2 | Table1_3 | Table1_4 | Table1_5 | Table1_6 |
| 002 | 50-2 | T3 | T4 | Table2_1 | Table2_2 | Table2_3 | Table2_4 | Table2_5 | Table2_6 |

| MOVEMENT ROUTE INFORMATION 1 | | | MOVEMENT ROUTE INFORMATION 2 | | | ... | CORRESPONDING PERSON | |
|---|---|---|---|---|---|---|---|---|
| TIME | POSITION | IMAGE POSITION | TIME | POSITION | IMAGE POSITION | | PERSON ID | IMAGING DEVICE ID |
| T1_1 | (x1,y1) | (Psx1,Psy1)-(Pex1,Pey1) | T1_2 | (x2,y2) | (Psx2,Psy2)-(Pex2,Pey2) | | | |
| T2_1 | (x4,y4) | (Psx4,Psy4)-(Pex4,Pey4) | T2_2 | (x5,y5) | (Psx5,Psy5)-(Pex5,Pey5) | | | |

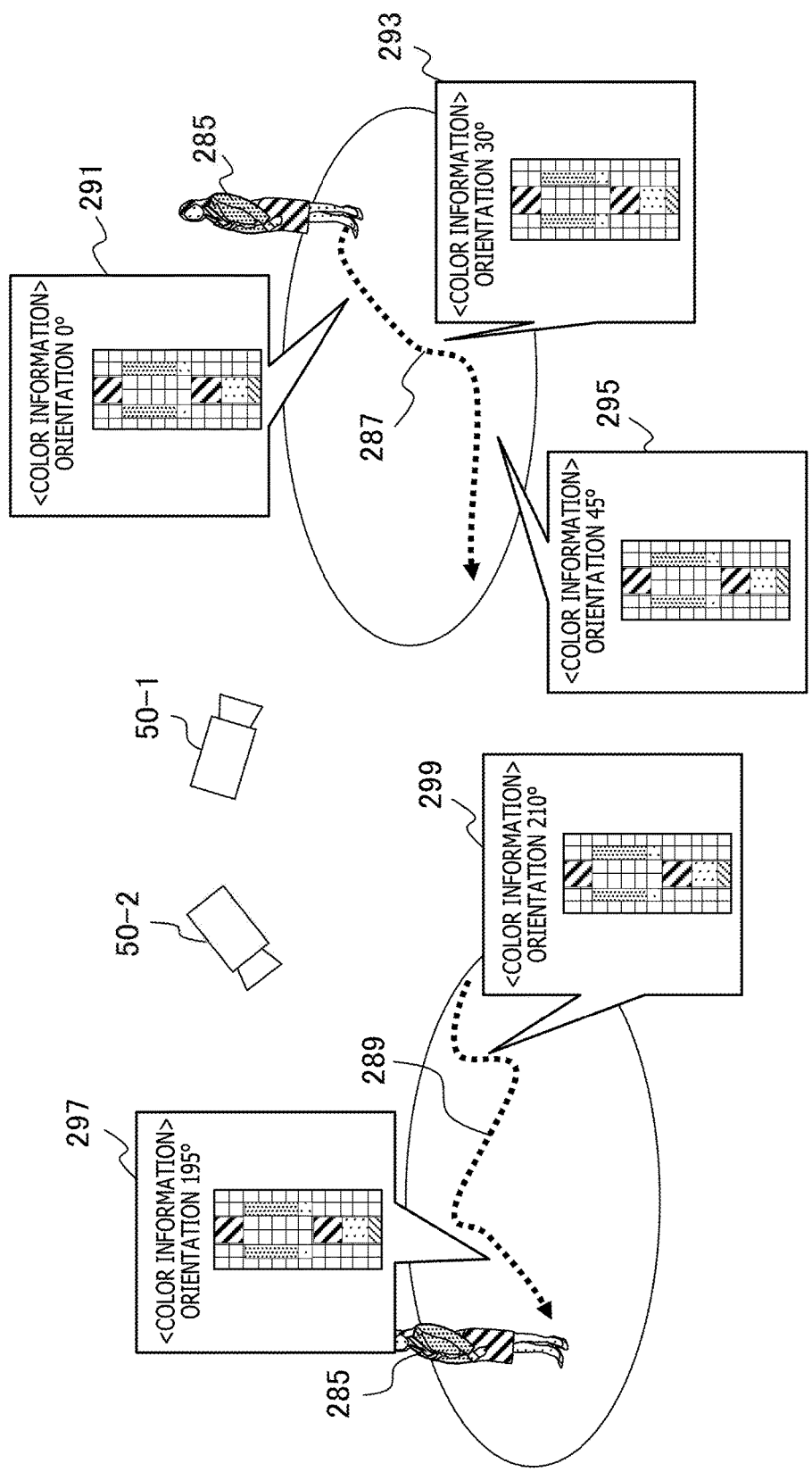

US 10,489,640 B2

DETERMINATION DEVICE AND DETERMINATION METHOD OF PERSONS INCLUDED IN IMAGING DATA

CROSS-REFERENCE TO RELATED APPLICATION

This application is based upon and claims the benefit of priority of the prior Japanese Patent Application No. 2015-039040, filed on Feb. 27, 2015, the entire contents of which are incorporated herein by reference.

FIELD

The embodiments discussed herein are related to a determination technology in which an image is used.

BACKGROUND

In recent years, a large number of surveillance cameras have been installed in various locations such as offices, shopping centers, and shopping streets. Also, there has been a move to comprehend the attributes and actions of people from these surveillance images for application in marketing.

Within this move, International Publication Pamphlet No. WO 2011/046128 discloses a technology that detects a person region from an input image of a surveillance camera, and determines a movement of a person in the person region. In this technology, the separability of the clothing of the person is determined to generate clothing portion separation information, and, in addition, clothing features indicating visual features of the clothing of the person in the person region are extracted taking into account the orientation of the person and the clothing portion separation information. The orientation of the person is determined based on the orientation of the face of the person, the movement of the person, and the symmetry of the clothing. The person is then retrieved based on a collation result between clothing query text indicating the type and color of the clothing of the person and the extracted clothing features of the person.

Japanese Laid-open Patent Publication No. 2007-258923 discloses an example in which an edge portion in a first image from among a plurality of images photographed using a plurality of photographing conditions is detected.

Japanese Laid-open Patent Publication No. 2003-263641 discloses a movement analysis device that has cameras, image processing devices, and a data integration analysis device. The cameras are a plurality of imaging devices that photograph images of a plurality of ranges within a specific region. The image processing devices process the images and extract feature values of a moving object that moves within the images and locus data that indicates the locus of the moving object within the respective ranges analyzed from the images. The data integration analysis device collates data of the feature values to verify the moving object photographed in the respective ranges, and integrates the locus data of the same moving object to create movement data indicating the state of the movement of the moving object within the region.

Furthermore, Japanese Laid-open Patent Publication No. 2011-18238 discloses a technology that divides an image acquired from an image or the like photographed by a camera into blocks of a prescribed size, and, based on a color histogram, extracts feature values of the blocks, and retrieves a target person.

Japanese Laid-open Patent Publication No. 2002-157599 discloses a technique for successively detecting one or more moving objects from a plurality of image signals successively input from a camera, through the use of a background difference method, a dynamic binary method, and template matching, and determining whether or not the moving objects belong to specific surveillance-target moving objects.

Furthermore, Japanese Laid-open Patent Publication No. 2014-92886 discloses a technique for calculating an image feature from the contour line of the head and the region around the shoulders of a person detected from an image, to obtain the orientation of a human body.

SUMMARY

According to an aspect of the invention, a determination device that determines whether or not a first person extracted from a first image is identified with a second person extracted from a second image, the determination device includes a memory and a processor coupled to the memory and configured to extract a first feature value of a contour portion of the first person, from the first image, extract a second feature value of a contour portion of the second person, from the second image, and determine whether the first person is identified with the second person, based on comparison processing in which a first effect on a first comparison result of the first feature value and the second feature value becomes greater than a second effect on a second comparison result of a third feature value of a portion further from a contour than the contour portion of the first person and a fourth feature value of a portion further from the contour than the contour portion of the second person.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a drawing depicting an example of the generation of a background difference image according to the first embodiment;

FIG. 7 is a drawing depicting an example of the detection of the orientation of a person according to the first embodiment;

FIG. 8 is a drawing depicting an example of a person information table according to the first embodiment;

FIG. 9 is a drawing depicting an example of a color information table according to the first embodiment;

FIG. 14 is a drawing depicting an example of a person information table according to a second embodiment;

FIG. 15 is a drawing depicting an example of a color information table according to the second embodiment;

FIG. 18 is a drawing depicting an example of a person information table according to a third embodiment;

FIG. 19 is a drawing describing an example of a same person determination method according to the third embodiment;

DESCRIPTION OF EMBODIMENTS

Conventional image determination methods such as the abovementioned have problems such as the following. More specifically, there are cases where the same person is captured from mutually opposing directions due to the camera installation environment, and in such situations it is sometimes not possible to suitably determine whether the same person has been captured. This is because, for example, with clothing that has an open front such as a cardigan, there is a significant difference in feature values such as the colors of an image captured from the front and an image captured from the back.

According to one aspect, an objective of the present disclosure is, when determining whether or not people in different images are the same person, to be able to determine in a highly precise manner whether the people are the same person even when the people are captured from different directions.

First Embodiment

Figure 1:
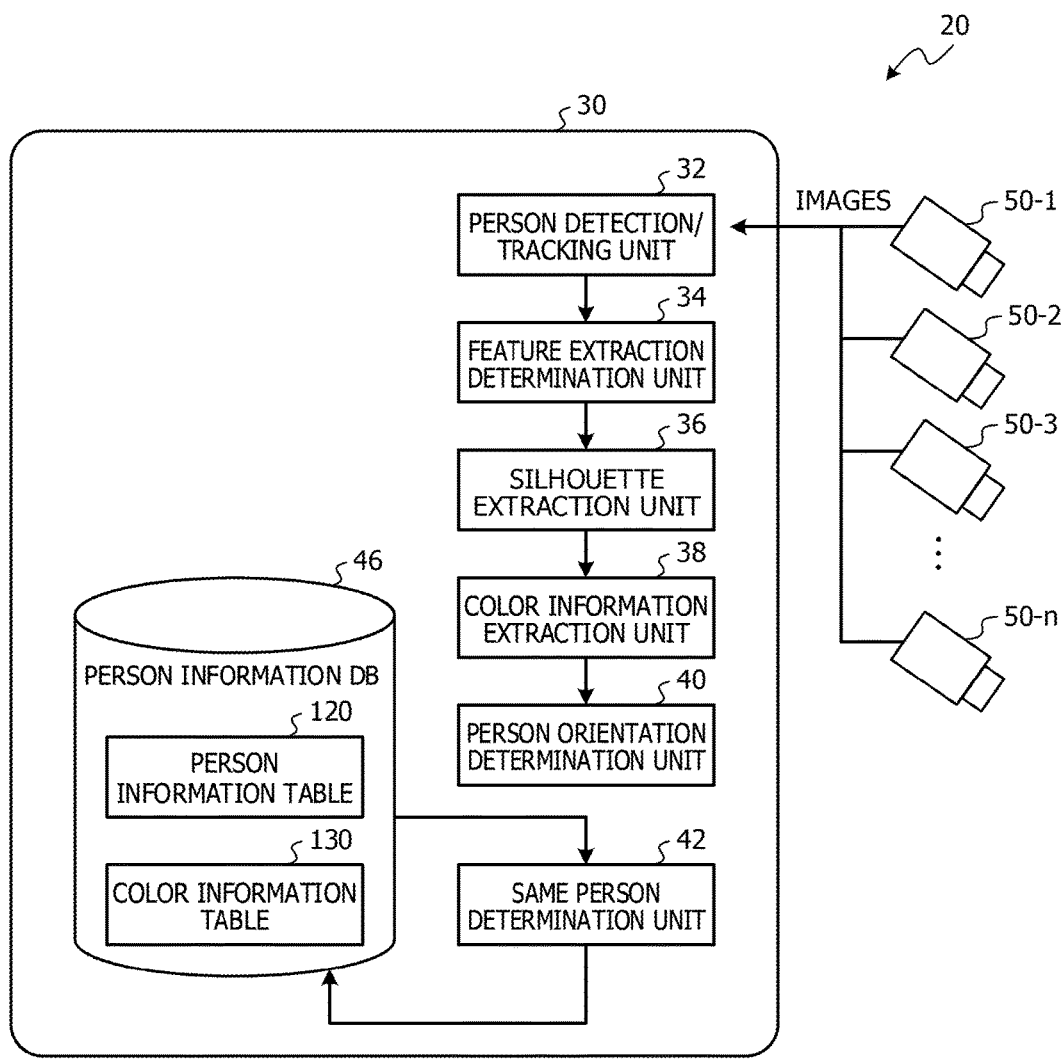
FIG. 1 is a drawing depicting an example of a configuration of an image determination device according to a first embodiment.

Hereinafter, an image determination device 20 according to the first embodiment will be described with reference to the drawings. FIG. 1 is a drawing depicting an example of a configuration of the image determination device 20 according to the first embodiment. As depicted in FIG. 1, the image determination device 20 has a processing device 30 and imaging devices 50-1 to 50-n (n being an integer of 1 or more). The processing device 30 is a device that receives images captured by the imaging devices 50-1 to 50-n (sometimes collectively or representatively referred to as the imaging devices 50), and performs image determination processing. The processing device 30 may be an information processing device having a processor and a memory, or one or more integrated circuits or the like, for example. The imaging devices 50 have respective imaging ranges that do not overlap, for example. The imaging devices 50 capture images of a surveillance area or the like at each fixed time or as video, for example.

The processing device 30 has a person detection/tracking unit 32, a feature extraction determination unit 34, a silhouette extraction unit 36, a color information extraction unit 38, a person orientation determination unit 40, a same person determination unit 42, and a person information database (DB) 46. The person information DB 46 (hereinafter, sometimes simply referred to as DB) is stored in a storage device such as a random access memory (RAM). The person information DB 46 includes a person information table 120 and a color information table 130.

The person detection/tracking unit 32 detects a person in images received from the imaging devices 50, and tracks a detected person in images received from the same imaging device 50. Tracking refers to specifying the same person in images in which the same imaging range has been captured in a time-sequential manner. The feature extraction determination unit 34 determines whether a person detected from an image of a certain imaging device 50 is suitable for the extraction of features used to determine whether the person is the same person as a person detected in an image of another imaging device 50. The case where the person is not suitable for the extraction of features refers to when part of the person is hidden or outside of the imaging range, or the person in the image is small, for example. A feature is color information, for example. Color information is the luminance value of each of the three primary colors of red, green, and blue of a certain pixel, for example.

The silhouette extraction unit 36 extracts only a person region from a received image. The method for extracting the person region is described later on. The color information extraction unit 38 extracts color information as the feature values of an image of a person. The person orientation determination unit 40 determines the orientation of a person in an image. For determining orientation, an existing method may be used such as the method described in Japanese Laid-open Patent Publication No. 2014-92886, in which an image feature is calculated from the contour line of the head and the region around the shoulders of a person, to obtain the orientation of a human body. Furthermore, the person orientation determination unit 40 causes the person information table 120 and so forth described later on to be stored in the person information DB 46. The same person determination unit 42 reads out the person information table 120 stored in the person information DB 46, and determines whether or not people detected in non-consecutive images or images received from mutually different imaging devices 50 are the same person. The person information DB 46, for example, includes the person information table 120, which indicates the movement information of a person and is described later, and the color information table 130, which corresponds to overall color information, contour color information, or the like.

Figure 2:
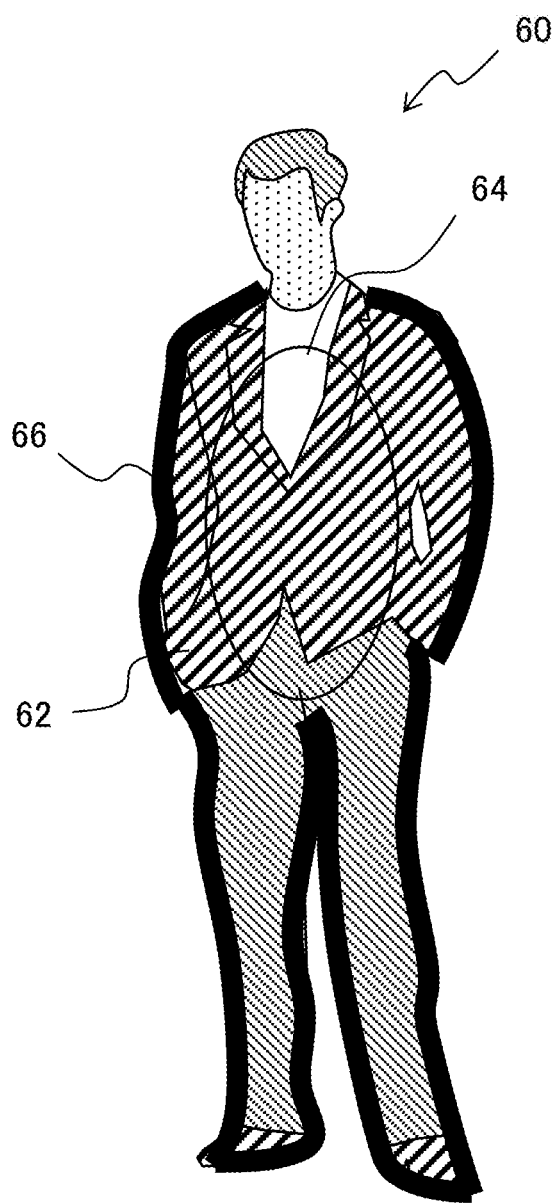
FIG. 2 is a drawing depicting an example image of a person in which an image determination method according to the first embodiment is applied.

FIG. 2 is a drawing depicting an example image of a person in which an image determination method according to the first embodiment is applied. As depicted in FIG. 2, a person 60 is an example of an image of a person extracted from an image captured by any of the imaging devices 50. The person 60 is an image of a man wearing a jacket 62. In the case of this person 60, there is an opening at the front of the jacket 62, and therefore there is a high possibility of a front section 64 not having the color information of only the jacket 62, and having color information that is different from that of a rear section. Therefore, in the present embodiment, color information corresponding to a contour portion 66 of the person 60 is used for image determination. Here, a contour refers to a boundary between an image of a person and a background image that does not include the person. A contour portion refers to a portion that is closer to a contour than other portions in an image of a person.

Figure 3:
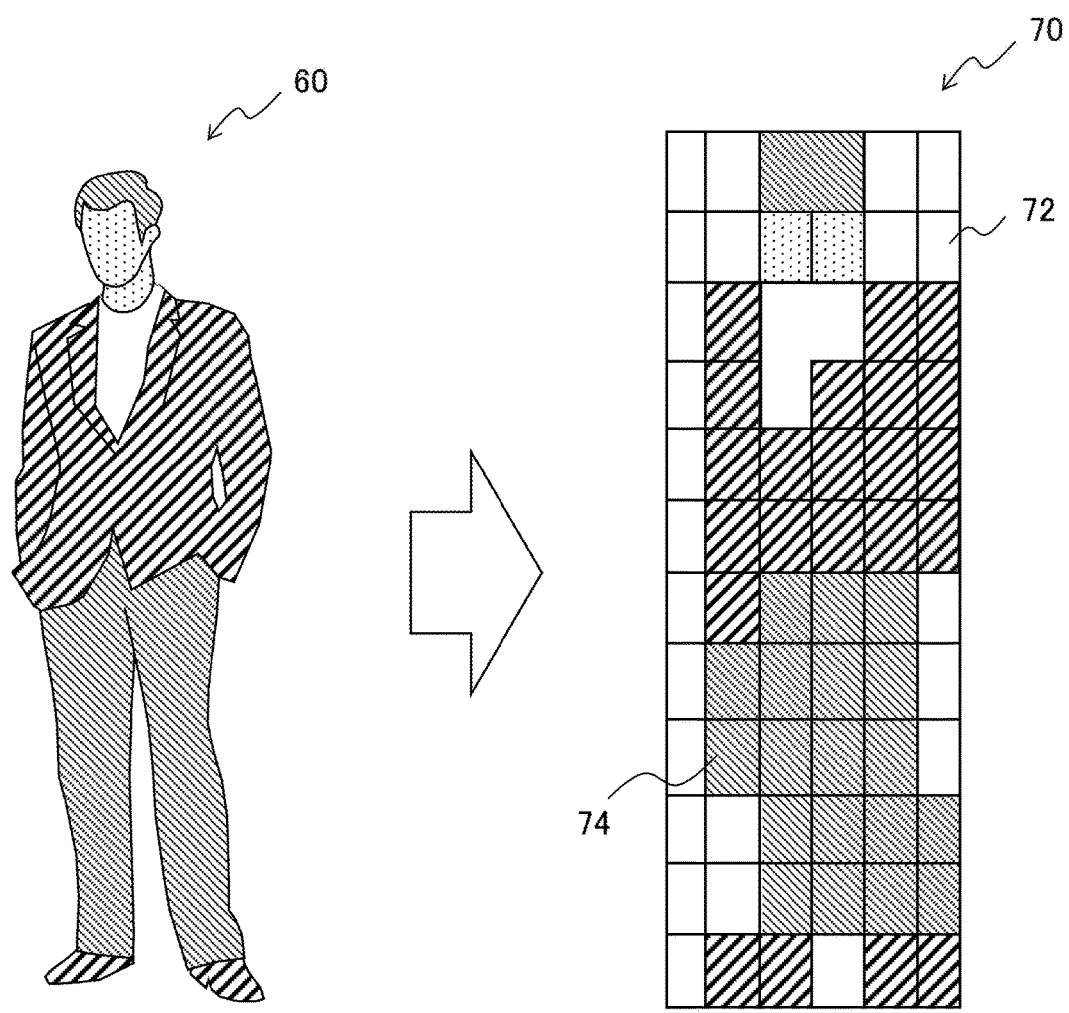
FIG. 3 is a drawing depicting an example of color information according to the first embodiment.

FIG. 3 is a drawing depicting an example of color information according to the first embodiment. As depicted in FIG. 3, feature values relating to the colors of the entirety of the person 60 constitute overall color information 70, for example. The overall color information 70 is information for which an image region that includes the entire person extracted from an image is divided into a plurality of block regions 72, color information is averaged in each block region, and each block region is indicated by a color corresponding to the obtained color information, as in the case of color information 74. It is preferable that the block regions 72 be rectangular regions of a prescribed size. It is preferable that this prescribed size be a size that is small enough such that feature values of an image of a person may be accurately expressed, and is large enough such that there is no decline in the precision of the alignment of two images when determining whether or not the same person has been captured. The size of a block region is expressed by the number of pixels included in the block region, for example.

FIG. 4 is a drawing depicting an example of the generation of a background difference image according to the first embodiment. As depicted in FIG. 4, an input image 80 is an image that includes a person 82. A background image 84 is an image that does not include the person 82, in which the same imaging range as that of the input image 80 is captured. In this way, in the case where there the input image 80 that includes the person 82 and the background image 84 that does not include the person 82 in the same imaging range as that of the input image 80 are present, a background difference image 86 constituting the difference between the input image 80 and the background image 84 is obtained. The background difference image 86 includes a silhouette 88 that is the region occupied by the person 82. The background difference image 86 may be a binary image in which a portion corresponding to the silhouette 88 is "1" and the portion other than the silhouette 88 is "0", for example. In this way, the silhouette 88 of the person 82 included in a certain input image 80 is obtained.

Figure 5:
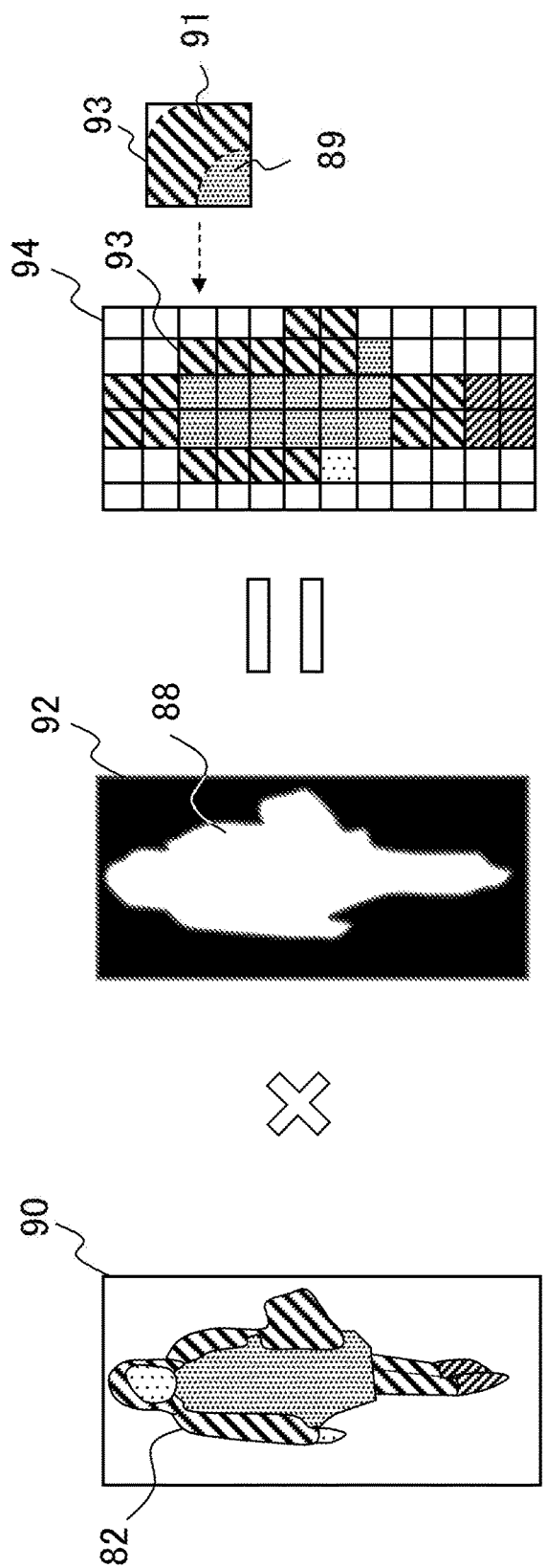
FIG. 5 is a drawing depicting an example of overall color information according to the first embodiment.

FIG. 5 is a drawing depicting an example of overall color information according to the first embodiment. As depicted in FIG. 5, a normalized image 90 is an image in which an image region including the person 82 extracted from the input image 80 of FIG. 4, for example, is normalized to a desired size. A silhouette image 92 is an image obtained by extracting a region corresponding to the normalized image 90 of the background difference image 86. Overall color information 94 is information indicating the average value of the color information of each block region when the normalized image 90 is divided into a plurality of block regions of a prescribed size.

For example, in a block region 93, a portion corresponding to the silhouette 88 of the normalized image 90 is assumed to be a red color region 89 and a black color region 91. At such time, the color information of the block region 93 becomes an average value obtained by dividing the sum of the color information of the color region 89 and the color region 91 by the number of pixels included in the color region 89 and the color region 91. In this example, in the overall color information, the color information of the block region 93 is represented as black.

Figure 6:
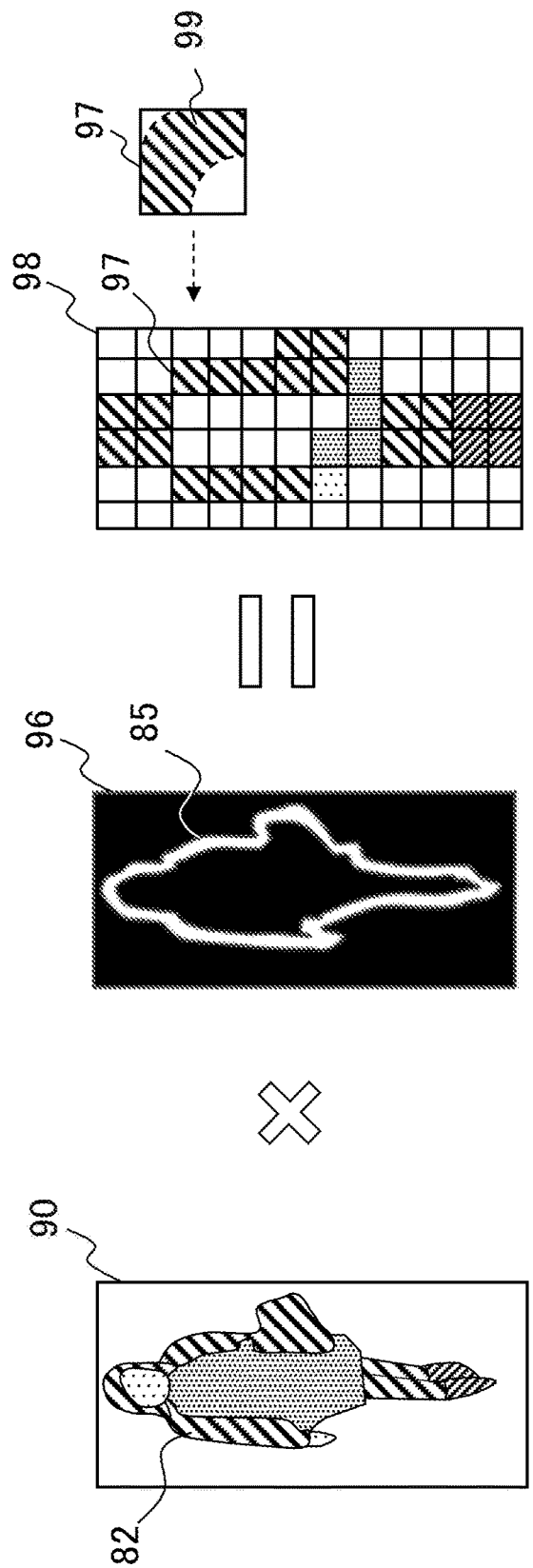
FIG. 6 is a drawing depicting an example of contour color information according to the first embodiment.

FIG. 6 is a drawing depicting an example of contour color information according to the first embodiment. As depicted in FIG. 6, contour color information is the color information of a portion corresponding to a mask 85 of a mask image 96 in the normalized image 90. The mask image 96 may be a binary image in which the portion corresponding to the mask 85 is "1" and the portion other than the mask 85 is "0", for example.

The mask 85 is an image indicating a region that is predetermined according to a contour, such as a region in which the shortest distance from the contour is within a prescribed distance, in the silhouette 88 in the silhouette image 92 of FIG. 5, for example. The mask 85 is an example of the contour portion of an image of the person 82. Contour color information 98 is information that indicates the average values of the color information of a region corresponding to the mask 85 in a plurality of block regions obtained by dividing the normalized image 90 into blocks of prescribed sizes. The region corresponding to the mask 85 is a region that overlaps the mask 85 in the normalized image 90. Note that the present embodiment is an example in which a comparison result according to the contour color information 98 of the region corresponding to the mask 85 is assumed to have a weighting of 1, and a comparison result according to the region other than the mask 85 is assumed to have a weighting of 0.

In a block region 97, a portion corresponding to the silhouette 88 of the normalized image 90 is assumed to be only a black color region 99, for example. At such time, the color information of the block region 97 is information indicating "black", which is the average of the color information of the color region 99.

FIG. 7 is a drawing depicting an example of the detection of the orientation of a person according to the first embodiment. As depicted in FIG. 7, a person orientation 100 of a person 102 is 0° in the case where the front of the person 102 has been captured, 180° in the case where the rear has been captured, 90° in the case where the person 102 is facing the right of the image, and 270° in the case where the person 102 is facing left.

In orientation detection example 104, an example is given in which the person 102 captured at the left edge of the image at time T=1 moves to the right side of the image as time elapses from time T=2 to 4. From the orientation detection example 104, a movement locus 105 is obtained when the center of gravity of the person 102 at each time is detected. The movement locus 105 is indicating that the person 102 is moving from the left to the right of the image. In this case, it is determined that the person is facing right (an orientation of 90°).

In an orientation detection example 106, the movement of the center of gravity of the person 102 is represented by a movement locus 107. The movement locus 107 is indicating that the person 102 is moving from the top to the bottom of the image. At such time, it is determined that the person 102 is facing the front (an orientation of 0°). Similarly, in the case where the movement locus of the center of gravity is indicating that the person 102 is moving from the right to the left of the image, it is determined that the person 102 is facing left (an orientation of 270°). In the case where the movement locus of the center of gravity is from the bottom to the top of the image, it is determined that the person 102 is facing the rear (an orientation of 180°). Note that, as previously mentioned, the determination of the orientation of the person is not restricted to the examples depicted in FIG. 7.

FIG. 8 is a drawing depicting an example of a person information table according to the first embodiment. As depicted in FIG. 8, the person information table 120 is a data table in which information of people detected from images acquired by the processing device 30 is collected. The person information table 120 includes a person ID that is identification information of a person detected in an image, an imaging device ID that is identification information of an imaging device 50, an appearance time, a disappearance time, a movement direction, feature values (color information), movement route information, and a corresponding person. The overall color information and the contour color information are included as feature values. The movement route information includes a time, a position, and an image position, and indicates the way in which a person has moved within the imaging range of an imaging device 50.

The person ID is identification information that identifies a person detected in a plurality of images captured in a time-sequential manner. The imaging device ID is identification information of the imaging device 50 that captured the detected person. The appearance time is the time at which the imaging of a target person started. The disappearance time is the time at which the target person is no longer being captured. The movement direction is the direction of movement of the center of gravity of the target person. The overall color information is identification information of an overall color information table described later on. The contour color information is identification information of a contour color information table described later on. The movement route information indicates the position (x, y) of the target person within an imaging range of an imaging device 50 at each time, and the range of the person in an image. The person ID of a corresponding person is the person ID of a person determined as being the same person in another image. The person ID of a corresponding person may be characteristic information that is separate from the identification information of a person determined as being the same person in another image. The imaging device ID of a corresponding person is the identification information of the imaging device 50 that has captured an image in which the person determined as being the same person has been detected. In the person information table 120, the person ID and the imaging device ID are blank, and indicate a state in which there is no same person information as yet.

FIG. 9 is a drawing depicting an example of a color information table according to the first embodiment. As depicted in FIG. 9, the color information table 130 includes information indicating the positions of block regions that correspond to color information in an image, as regions. The block regions are units in which the average value of color information is calculated, such as the block regions 72 of FIG. 3. The color information (R, G, B) is the average value of the luminance value of each of the three primary colors of red, green, and blue in each region.

It is preferable that either of the overall color information 94 and the contour color information 98 described in FIG. 5 and FIG. 6 be generated in a form such as that of the color information table 130 and be stored in the person information DB 46, for example. In the overall color information 94 and the contour color information 98, there are cases where the average numbers of pixels or color information are different even with color information that corresponds to the same block position, for example. In cases such as these, for example, the average values of the color information are sometimes different as in the examples of the block region 93 and the block region 97. Furthermore, in the person information table 120, although color information is denoted as "Tabel1_1" and so forth, each includes information such as that of the color information table 130 of FIG. 9.

Figure 10:
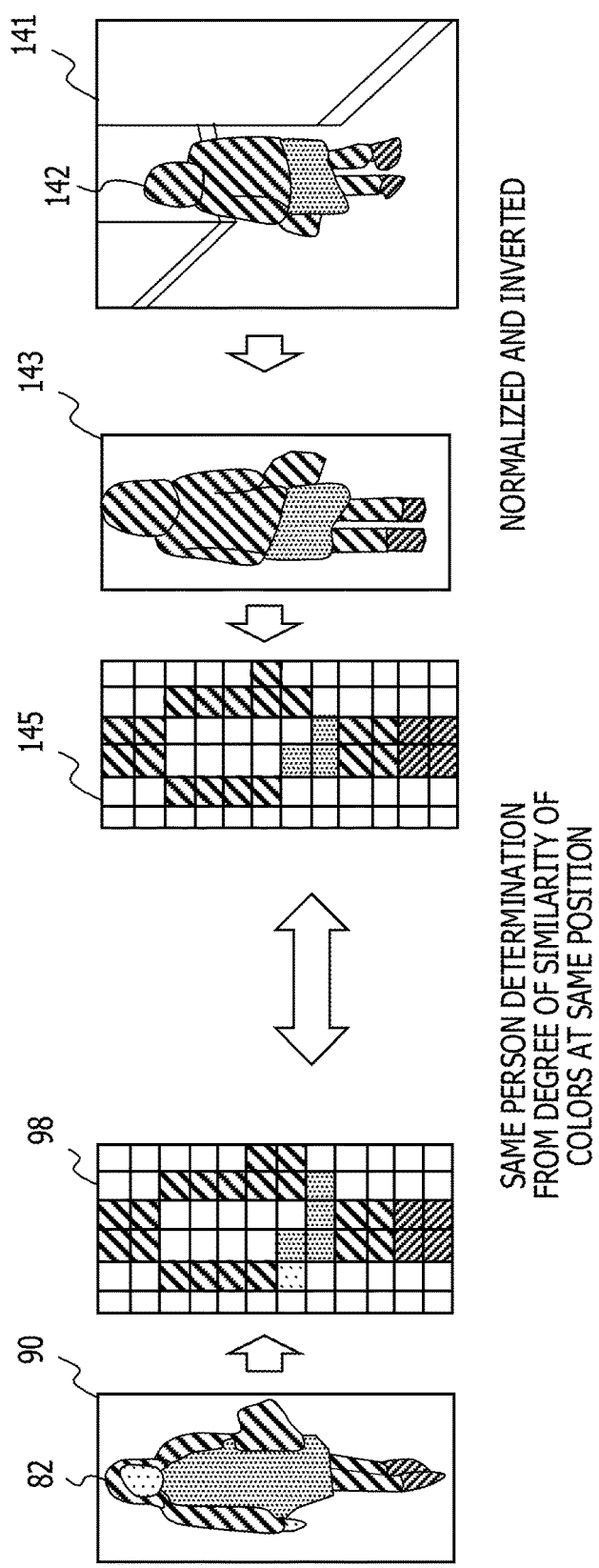
FIG. 10 is a drawing describing an example of a same person determination according to the first embodiment.

FIG. 10 is a drawing describing an example of a same person determination according to the first embodiment. As depicted in FIG. 10, in this example, a determination is performed with a normalized image 90 obtained by an imaging device 50-1 and an opposite orientation image 141 obtained by an imaging device 50-2. As depicted in FIG. 10, a person 142 is detected in the opposite orientation image 141 but it is determined that the orientation thereof is the opposite to that of the person 82 of the normalized image 90. Therefore, a normalized inverse image 143, for which an image is normalized and inverted, is generated from the opposite orientation image 141. Furthermore, the contour color information 98 is used to determine whether or not the same person has been captured. Thus, contour color information 145 corresponding to the normalized inverse image 143 is generated. The generation of the contour color information 145 may be performed with the method described with reference to FIGS. 4 to 6. Here, processing such as the following is performed; the color information of corresponding regions is compared using the generated contour color information 98 and contour color information 145, and if the sum of the differences between the color information of the regions is equal to or less than a prescribed value for example, it is determined that the person 82 and the person 142 are the same person.

Figure 11:
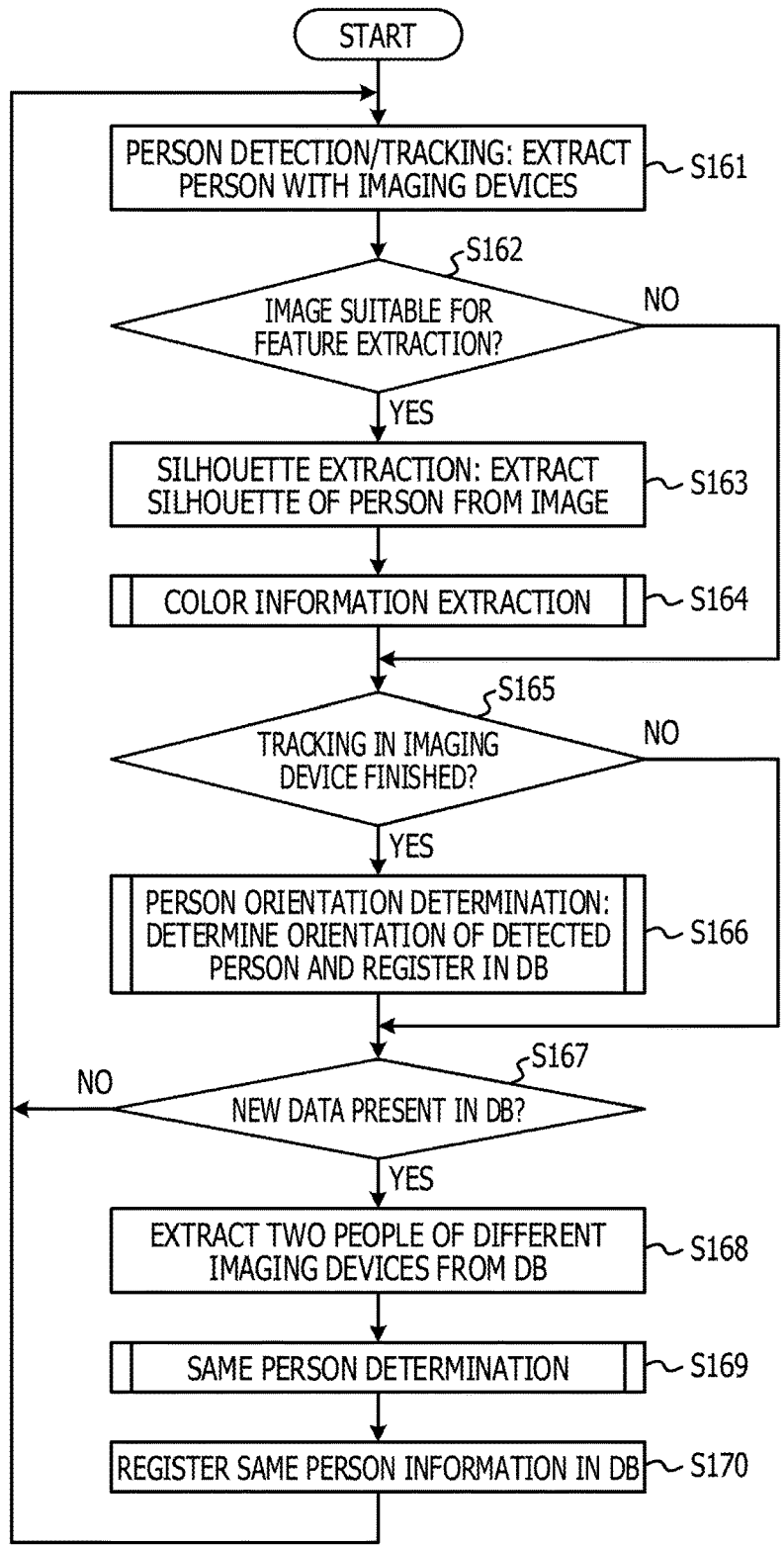
FIG. 11 is a flowchart depicting an example of image determination processing according to the first embodiment.

FIG. 11 is a flowchart depicting an example of image determination processing according to the first embodiment. Note that the case where a person moves along a narrow passageway such as a corridor is described in the present embodiment. Therefore, it is assumed that the movement direction includes the two patterns of a frontward direction and a rearward direction.

As depicted in FIG. 11, first, the person detection/tracking unit 32 performs detection/tracking of a person from images captured by the imaging devices 50 and input to the processing device 30 (S161). Specifically, the person detection/tracking unit 32 acquires, for example, video first captured by the imaging devices 50, and converts the acquired video into frame-by-frame images in order to perform subsequent processing. The person detection/tracking unit 32 then detects people from the converted images. The person detection/tracking unit 32 extracts, from each detected person, feature values (such as detection positions, face images, and movement vectors) for tracking the same person within images obtained by the same imaging device. The person detection/tracking unit 32 performs person tracking by associating a person detected in the previous frame that was last captured, and a person extracted in the current frame that is a target for processing (hereinafter, sometimes referred to as the processing-target frame).

For the detection and tracking of a person in images captured by the same imaging device, the following technique, such as that described in Japanese Laid-open Patent Publication No. 2002-157599, for example, may be used. More specifically, a technique may be used in which one or more moving objects are successively detected from a plurality of image signals successively input from the imaging devices 50 through the use of a background difference method, a dynamic binary method, and template matching, and it is determined whether or not the moving objects belong to specific surveillance-target moving objects. Furthermore, another publicly known method may be used.

The feature extraction determination unit 34 determines whether a processing-target image is an image that is suitable for extracting features (S162). An image that is suitable for extracting features is an image in which a person is captured in a large manner, an image of a person in which there are a few hidden portions, or the like. In the present embodiment, color information extracted from images is used as the features of the people for whom a determination is to be performed as to whether or not they are the same person among the plurality of imaging devices 50. For the color information, information is used that is extracted from images from which it is easiest to extract features from within a series of images in which people move within the range captured by the imaging devices 50. Processing advances to S163 if the feature extraction determination unit 34 determines that the current processing-target image is more suitable for feature extraction than images from which features have been extracted up until then (S162: yes), and processing advances to S165 if the feature extraction determination unit 34 determines that the current processing-target image is not suitable (S162: no). At such time, for example, the determination of S162 may be performed with a method such as storing the size of the person in a processing-target image, and, if the size of a newly extracted person is larger than the stored size, determining that the newly extracted person is suitable for feature extraction.

In the case where the processing-target image is suitable for extracting features, the silhouette extraction unit 36 extracts and normalizes an image of a person, performs a comparison with a background image, for example, and thereby extracts a silhouette image (S163), as described with reference to FIGS. 4 and 5.

The color information extraction unit 38 extracts color information as feature values of an image of a person. At such time, in the first embodiment, the color information extraction unit 38 extracts overall color information corresponding to an extracted silhouette image portion described with reference to FIG. 5, for example. Furthermore, the color information extraction unit 38 extracts contour color information corresponding to the mask 85 described with reference to FIG. 6 (S164). The details of the color information extraction processing are described later on.

The person detection/tracking unit 32 determines whether the tracking of a person in images captured by the imaging device in question has finished (S165). The tracking of a person finishing refers to a state in which a person is no longer being captured. Feasible situations are a person moving out of the imaging range of the imaging devices 50, and imaging finishing, for example. If tracking has not finished (S165: no), the person detection/tracking unit 32 advances processing to S167.

If tracking has finished (S165: yes), the person orientation determination unit 40 determines the orientation of a person in an image, and registers information relating to the extracted person in the person information table 120, for example, of the person information DB 46 (S166). At such time, it is preferable that the information be updated in the case where the person is already registered.

The same person determination unit 42 determines whether new data is present in the person information DB 46 (S167), and in the case where new data is not present (S167: no), repeats processing from S161. In the case where data of a new person that does not include information regarding a corresponding person is registered in the person information table 120 of the person information DB 46 (S167: yes), the same person determination unit 42 performs the following processing. More specifically, the same person determination unit 42 extracts the new person and a person who has been extracted from an image captured by an imaging device 50 that is different from that of the new person and is to be a comparison target, from the person information table 120, for example, of the person information DB 46 (S168).

For the person who is to be a comparison target, all of the people registered in the person information table 120 up until then may be set as targets, or information such as the time and movement route may be added to the person information table 120, and narrowing down may be performed to a person who satisfies a condition such as a person who has been registered within a fixed time. In the case where there are a plurality of people who are comparison targets, the same person determination unit 42 calculates a degree of similarity with all of the people who are comparison targets, and obtains the person having the highest degree of similarity from thereamong. The same person determination unit 42 then determines that the selected person is the same person in the case where the degree of similarity of the selected person is equal to or greater than a threshold value, and a person ID that is the same as the person ID of that person is stored as the person ID of the corresponding person of the newly registered person. In the case where the degree of similarity is less than the threshold value, the same person determination unit 42 determines that the selected person is not the same person, and a new person ID may be stored.

The same person determination unit 42 compares information in the person information table 120 of the two extracted people (S169). For example, in the present embodiment, the same person determination unit 42 compares items of contour color information, and from the degree of similarity thereof, determines whether the two extracted people are the same person. The details of the same person determination processing are described later on.

In the case where the same person is determined, in the person information table 120 of the person information DB 46, the person ID attached to the person determined as being the same person and an imaging device ID are registered as the person ID and the imaging device ID of the corresponding person (S170), and processing is repeated from S161.

Figure 12:
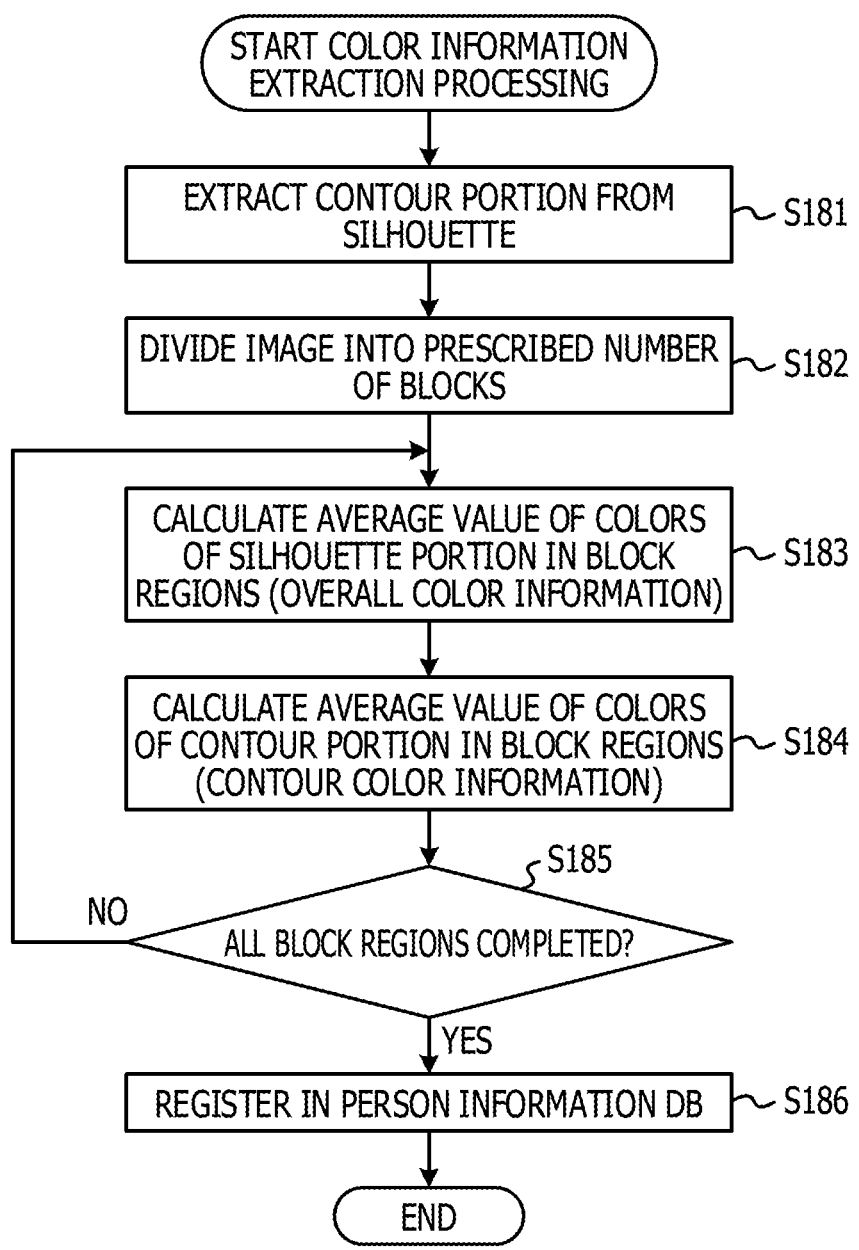
FIG. 12 is a flowchart depicting an example of color information extraction processing according to the first embodiment.

FIG. 12 is a flowchart depicting an example of color information extraction processing according to the first embodiment. The color information extraction processing is the processing of S164 of FIG. 11. As depicted in FIG. 12, the color information extraction unit 38 extracts a person and normalizes an image. This is processing for making it possible to compare extracted people using the same size, in which the head position, the inclination of the body, the size, and so forth of a person are normalized to prescribed values that are determined in advance. Next, the color information extraction unit 38, for example, extracts the silhouette 88, and extracts a contour portion from the silhouette 88 (S181). For example, as described with reference to FIG. 4, the silhouette extraction unit 36 may use a method or the like for extracting only a person region in the foreground, by way of a background difference method in which portions having the same color as a background image are removed from an image.

The color information extraction unit 38 divides a normalized image into a number of prescribed blocks (S182). More specifically, the normalized image is divided into a plurality of regions such as the block regions 72 depicted in FIG. 3. The color information extraction unit 38 calculates an average value for the color of the silhouette portion in each block region, and generates overall color information (S183). The color information extraction unit 38 calculates an average value for the color of the contour portion in each block region, and generates contour color information (S184). In this way, two types of color information are generated. One type is, for example, overall color information 94 that is created from the colors of the entire body of a person, and another type is contour color information 98 that is created from the colors of the contour portion.

For the overall color information 94, for example, as described with reference to FIG. 6, the silhouette image 92 is used to extract the values of the image color information of portions in which the value of the silhouette image 92 is "1" for example in each block region, in other words, portions that correspond to the silhouette 88, and the values are averaged and registered.

For the contour color information 98, for example, a mask image 96 for extracting only colors in the vicinity of the boundary of the silhouette of a person is created from the silhouette image 92, and, for example, only portions in which the value of the mask image 96 is "1", the color of the mask 85 in other words, are extracted to create color information. In the mask image 96, only the area where the distance (number of pixels) from the contour of the silhouette image 92 is equal to or less than a fixed value are left as "1", and the remaining portion is set as "0". Block regions in which the mask is "0" and from which colors are not extracted are treated as not having color information.

The color information extraction unit 38 repeats processing from S183 until the calculation of an average value of the colors for the overall color information and the contour color information is finished in all of the block regions (S185: no). When the calculation processing is completed for all of the block regions (S185: yes), the color information extraction unit 38 registers the created overall color information and contour color information in the person information DB 46 as the color information table 130 and the person information table 120 (S186), and returns to the processing of FIG. 11.

Figure 13:
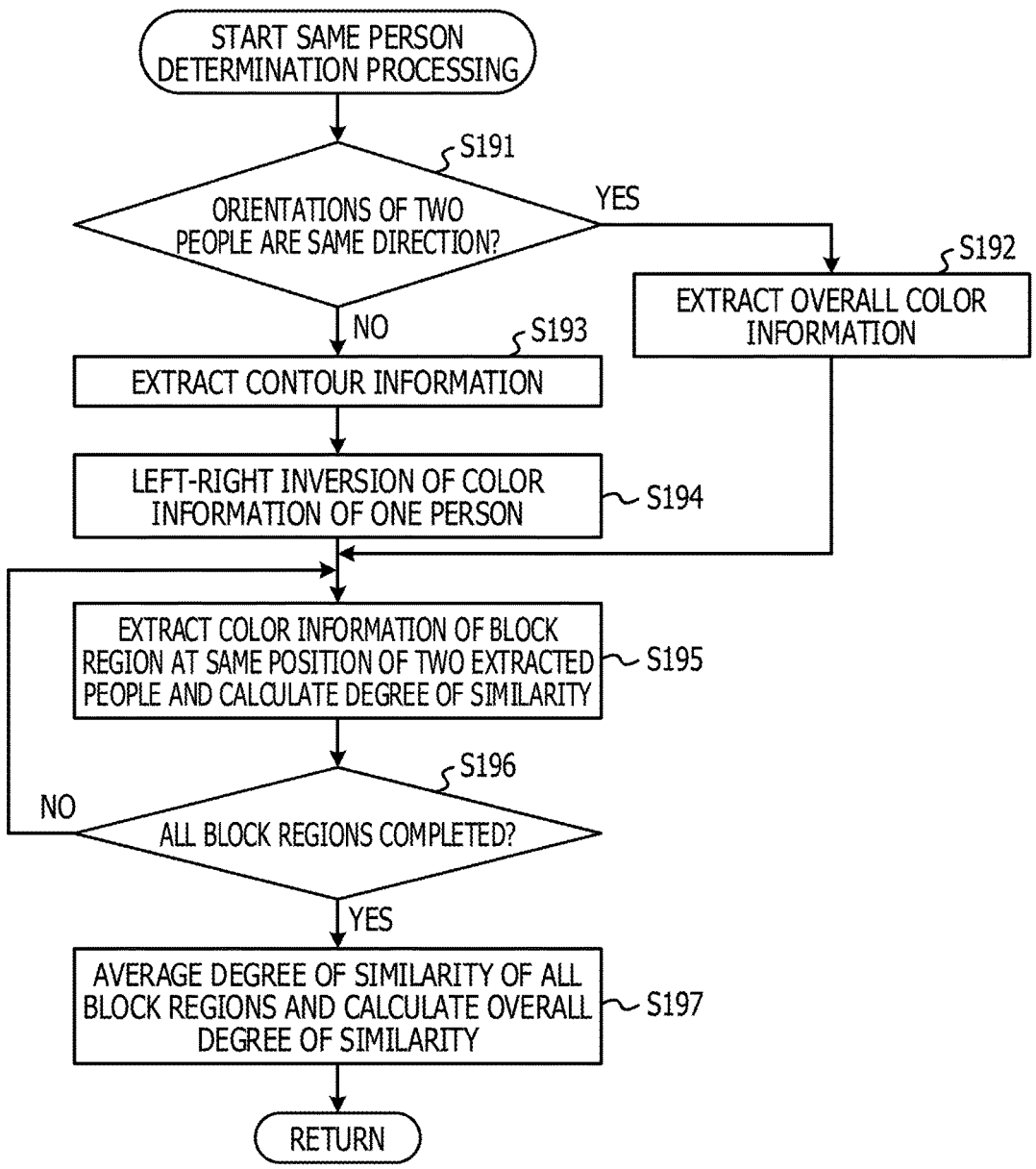
FIG. 13 is a flowchart depicting an example of a same person determination procedure according to the first embodiment.

FIG. 13 is a flowchart depicting an example of a same person determination procedure according to the first embodiment. The person determination processing is the processing of S169 of FIG. 11. As depicted in FIG. 13, the same person determination unit 42 determines whether the orientations of the two people extracted in S168 are the same direction (S191). If the same direction (S191: yes), the same person determination unit 42 refers to and extracts the overall color information of each person from the person information table 120 (S192).

If the orientations of the two people extracted in S168 are not the same direction (S191: no), the respective contour color information thereof is extracted (S193). Note that the present embodiment is restricted to the case where people are facing the same direction or opposite directions such as in the case of a corridor, and therefore, here, the same person determination unit 42 determines that the two people are facing opposite directions, and causes one item of contour color information to be inverted in a left-right manner (S194).

The same person determination unit 42 extracts color information of block regions in the same position of the two extracted people to calculate a degree of similarity (S195). More specifically, the same person determination unit 42 obtains a degree of similarity from a color distance in RGB space for each block in the same position of the color information of the two people. The same person determination unit 42 repeats the processing of S195 until the calculation of a degree of similarity is completed for all of the block regions (S196: no), and when completed (S196: yes), averages the degrees of similarity of all of the blocks to calculate a degree of similarity for the whole of the two people (S197).

As described in detail hereinabove, according to the image determination device 20, the processing device 30 determines whether or not a first person extracted from a first image and a second person extracted from a second image are the same person. At such time, the processing device 30 performs the determination based on comparison processing in which the effect on a comparison result produced by a feature value of the contour portion of the first person and a feature value of the contour portion of the second person becomes greater than the effect hereinafter; more specifically, the effect on a comparison result produced by a feature value of a portion further from the contour than the contour portion of the first person and a feature value of a portion further from the contour than the contour portion of the second person.

As described hereinabove, according to the image determination device 20 of the first embodiment, when determining whether or not people in different images are the same person, a comparison is performed with the comparison result of the contour portions being more heavily weighted than comparison results according to other portions also in the case where people are captured from different directions. Thus, it becomes possible to determine whether or not the people are the same person with a high degree of precision. For example, when people who are captured from different directions are to be associated, the color information only in the vicinity of the contour of a person is extracted, and therefore it is possible to perform a same person determination by comparing the color information of positions corresponding at the front and rear in the case where a person is seen from the front and in the case where seen from the rear. As well as comparing colors only in very close positions between two images such as contour portions, it is possible to reduce comparisons of portions that are likely to have different colors at the front and rear, and therefore it is possible to determine whether or not the people are the same person even in a case such as where imaging is being performed from directions that are different by 180°.

It is possible for the same person to be identified based on the feature values of people detected among a plurality of imaging devices, for example, and therefore it is possible to acquire a movement route of a person having a wide range, such as in the case where there exists a non-captured region between imaging devices such as the surveillance imaging devices that are generally installed. Thus, by using the movement routes of customers inside a store such as a convenience store, it is possible to select products to be displayed and to understand customer trends. By understanding the movement routes of people across a wider range, it becomes possible to obtain a large amount of information that is desired for marketing activities and so forth.

In the first embodiment, the mask image 96, which includes the mask 85 in which only the areas where the distance from the contour of the silhouette 88 of the silhouette image 92 is equal to or less than a fixed value are set as "1", is created as a method for extracting the contour color information 98; however, another method besides this may be used. For example, the width of the mask 85 may not be fixed as a prescribed number of pixels, and may be a width of a prescribed proportion of a person width, in accordance with the width of the body of the person extracted. By doing so, color information in the vicinity of the contour is extracted with the same proportion regardless of the orientation of the person captured and the width of the person. Thus, the possibility of unnecessary colors being extracted decreases regardless of the size of the body of the person.

Furthermore, a method may be used in which, rather than the range in which colors are extracted being defined as a width, color information up to portions where the colors are similar to the vicinity of the contour is used. By doing so, in the case where a clothing pattern is present in the vicinity of the contour when seen from the front and a pattern is not present when seen from the rear, for example, it is possible for the color extraction range to be changed in those respective orientations, and therefore it becomes possible to use the color of the pattern without it being extracted as color information of the contour.

In addition, it is likely that the contour portion may be strongly irradiated with light from a light source, and there is a possibility of a washed-out color that becomes white being generated in the image, and therefore a selection method such as not using the color information of a pixel that is equal to or greater than a certain prescribed brightness may be added.

Second Embodiment

Hereinafter, an image determination method according to a second embodiment will be described. In the second embodiment, configurations and operations that are the same as those of the first embodiment are denoted by the same numbers and redundant descriptions are omitted.

In the image determination method according to the second embodiment, the content of the person information table and the color information is different from that in the image determination method according to the first embodiment. The configuration of the image determination device according to the second embodiment is the same as that of the image determination device 20 according to the first embodiment. Furthermore, the main flow of the image determination processing according to the second embodiment is the same as that of the first embodiment and is indicated in the flowchart depicted in FIG. 11.

FIG. 14 is a drawing depicting an example of the person information table according to the second embodiment. As depicted in FIG. 14, a person information table 200 is a data table in which information of people detected from images acquired by the processing device 30 is collected. The person information table 200 includes a person ID, an imaging device ID, an appearance time, a disappearance time, a movement direction, feature values (color information), movement route information, and a corresponding person, which are detected in a plurality of images captured in a time-sequential manner by the imaging devices 50. Overall color information only may be included as the feature values. The movement route information includes a time, a position, and an image position, and indicates the way in which a person has moved within the imaging range of an imaging device 50.

The person information table 200 according to the second embodiment is different from the person information table 120 according to the first embodiment in that the color information does not include contour color information and that the configuration of the overall color information is different.

FIG. 15 is a drawing depicting an example of a color information table according to the second embodiment. As depicted in FIG. 15, in addition to the color information table 130 according to the first embodiment, the color information table 205 includes information on the distance from a contour (number of pixels). This distance from a contour indicates the extent to which the color information in question is color information of inside the body of a person.

The image determination processing according to the second embodiment is processing in which the color information extraction processing of S164 and the same person determination processing of S169 in the processing described with reference to FIG. 11 in the first embodiment are different.

Figure 16:
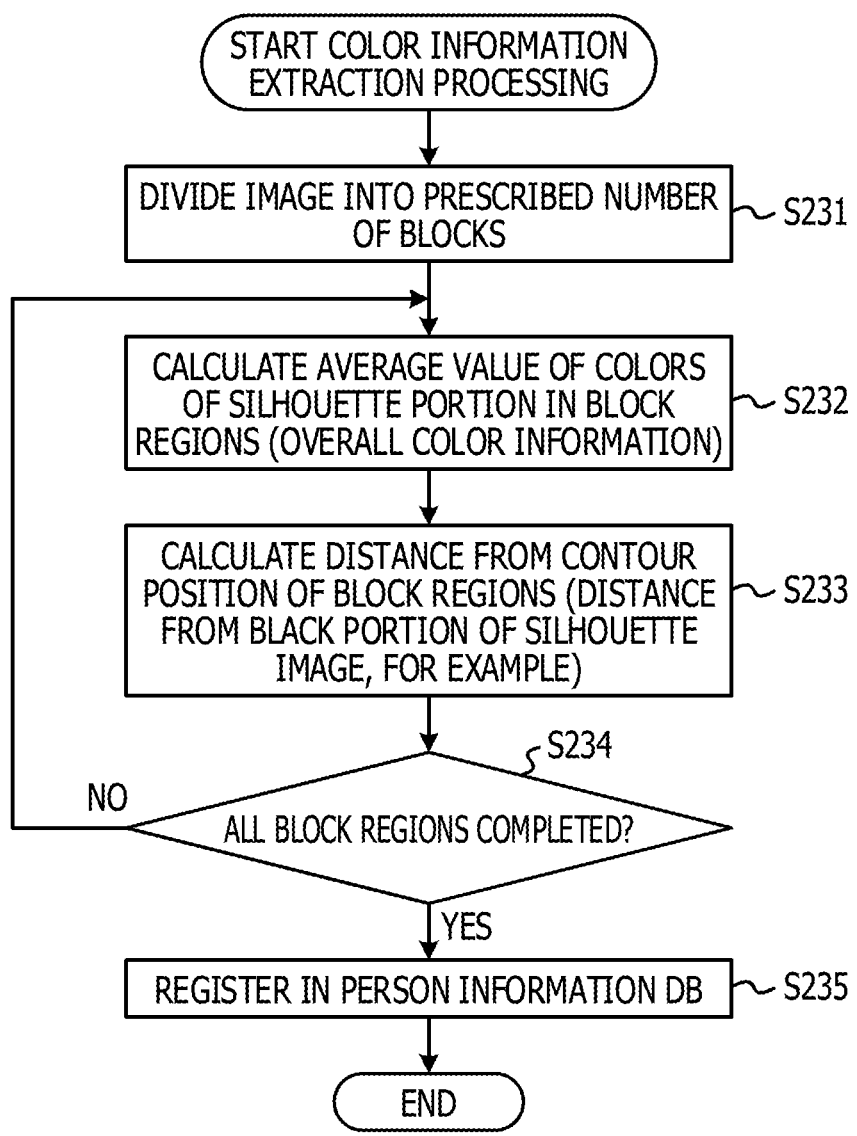
FIG. 16 is a flowchart depicting an example of color information extraction processing according to the second embodiment.

FIG. 16 is a flowchart depicting an example of color information extraction processing according to the second embodiment. The color information extraction processing is the processing of S164 of FIG. 11. As depicted in FIG. 16, first, the color information extraction unit 38 divides the normalized image 90 depicted in FIG. 5, for example, into a prescribed number of blocks. This division may be the same as the division according to the first embodiment (S231). The color information extraction unit 38 calculates an average value for the color of the portion of the silhouette 88 depicted in FIG. 5, for example, in each block region.

The color information extraction unit 38 calculates an average value for the color of the silhouette portion in each block region, and generates overall color information (S232). The color information extraction unit 38 calculates the distance from the contour position in each block region. More specifically, the distance from the outer edge of the silhouette 88 is calculated, for example (S233).

The color information extraction unit 38 repeats processing from S232 until the calculation of the overall color information and the distance from the contour is finished in all of the block regions (S234: no). When it is determined that the calculation processing is completed for all of the block regions in S234 (S234: yes), the color information extraction unit 38 registers the created overall color information and the distances from the contour in the color information table 205 and the person information table 200 (S235), and returns to the processing of FIG. 11.

Figure 17:
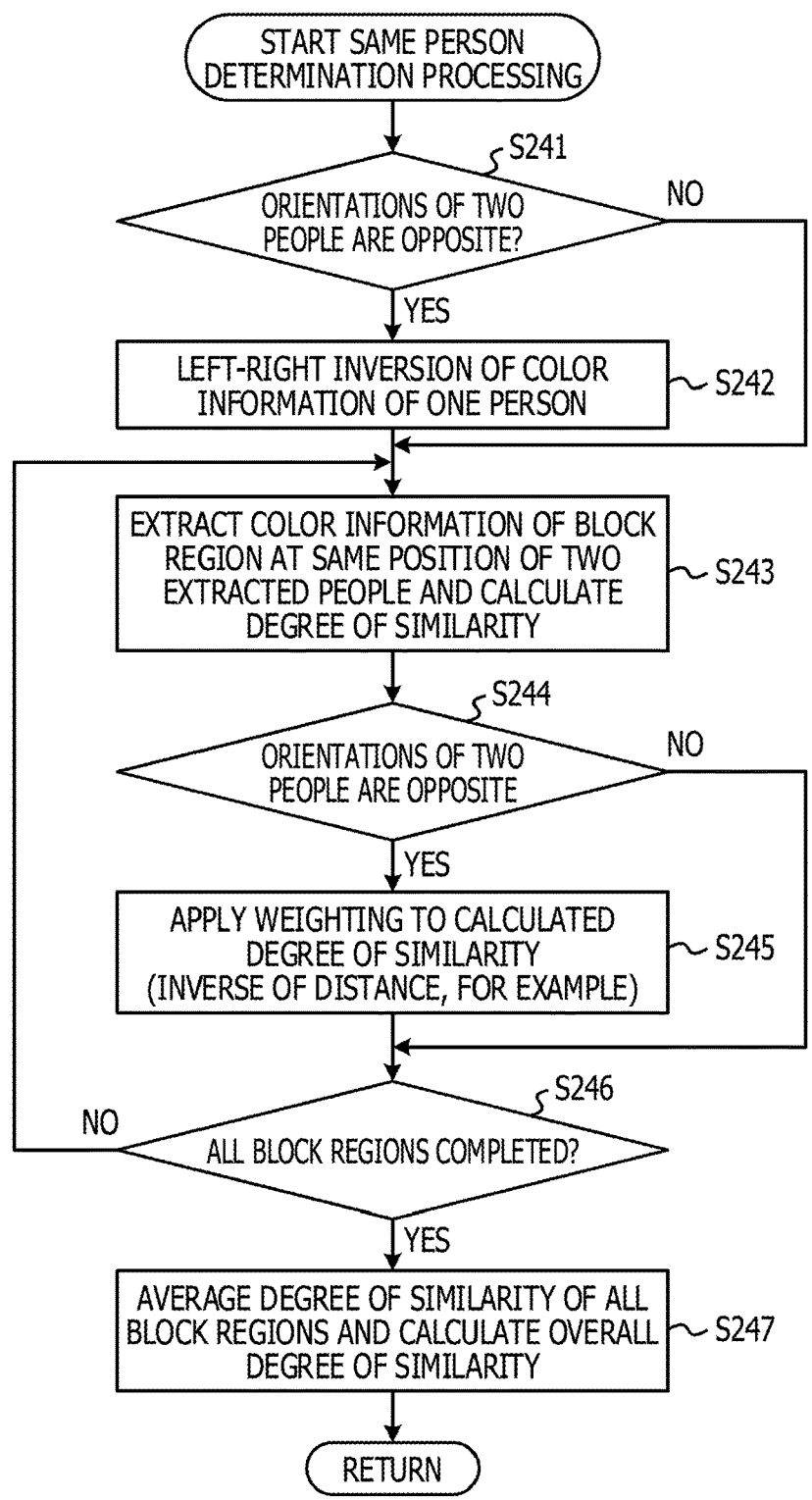
FIG. 17 is a flowchart depicting an example of a same person determination procedure according to the second embodiment.

FIG. 17 is a flowchart depicting an example of the same person determination procedure according to the second embodiment. The person determination processing is the processing of S169 of FIG. 11. As depicted in FIG. 17, the same person determination unit 42 determines whether the orientations of the two people extracted in S168 of FIG. 11 are opposite directions (S241). If opposite directions (S241: yes), the same person determination unit 42 causes one item of overall color information to be inverted in a left-right manner (S242), and advances processing to S243. If not opposite directions (S241: no), the same person determination unit 42 advances processing directly to S243.

The same person determination unit 42 refers to and extracts the overall color information of each person with reference to the person information table 200 (S242). The same person determination unit 42 extracts color information of block regions in the same position of the two extracted people to calculate a degree of similarity (S243).

The same person determination unit 42 determines whether the orientations of the two people are opposite (S244). If not opposite (S244: no), the same person determination unit 42 advances processing to S246. If opposite (S244: yes), the same person determination unit 42 applies a weighting to the calculated degree of similarity (S245). In the case where a weighting is to be applied, the inverse of the distance from the contour may be applied, as an example. Furthermore, for the distance, a distance corresponding to the block region in question stored in the color information table 205 for either of the two people may be used. More specifically, in this processing of S243, the same person determination unit 42 may calculate a color distance in RGB space for each of the blocks in the same position for the color information of the two people, and may apply a weighting for the color information of either of the two people to the calculated distance to obtain a degree of similarity.

Note that, also in the second embodiment, in the case where there are a plurality of people who are comparison targets, it is preferable that a degree of similarity with all of the people be calculated, and the person having the highest degree of similarity from thereamong be obtained. It is then determined that the selected person is the same person in the case where the degree of similarity of the selected person is equal to or greater than a threshold value, and the same person determination unit 42 stores information that is the same as the person ID indicating that person, as the person ID of the corresponding people of the newly registered person. In the case where the degree of similarity is less than the threshold value, it is determined that the selected person is not the same person, and new information is stored.

As described hereinabove, in the image determination method according to the second embodiment, the overall color information, for which the color of an entire body is extracted, is used for a degree of similarity to be calculated also in the case where the movement directions of two captured people are different. However, the degree of similarity may be calculated after performing normalizing by applying a weighting corresponding to the distance from the contour to the color information. When the average degree of similarity of all of the block regions is to be calculated, a weighting that is different for the degree of similarity of each block region is applied in accordance with the distance from the contour described in the color information table. Alternatively, when a degree of similarity is to be calculated, a weighting corresponding to the distance from the contour is applied to the color information. Specifically, a function is used with which, for example, the weighting increases nearer to the contour and the weighting decreases further away from the contour and toward the center of the body, such as the inverse of the distance. It thereby becomes possible to mainly use the color of the contour portion to perform a same person determination in the case where the orientations are different. Note that, in the case where the movement directions of the two people are different, the position of a block region and the corresponding location are inverted, and therefore the degree of similarity is obtained after one has been inverted.

As described hereinabove, according to the image determination method of the present embodiment, when determining whether or not people in different images are the same person, a comparison is performed with the comparison result of the contour portions being more heavily weighted than comparison results according to other portions also in the case where people are captured from different directions. Thus, it becomes possible to determine whether or not the people are the same person with a high degree of precision. In addition, different from the first embodiment, the overall color information and the contour color information do not have to be retained separately, and only the overall color information having the contour distance added thereto may be stored. Therefore, there is an effect in that it is possible to reduce the storage capacity.

Third Embodiment

Hereinafter, an image determination method according to a third embodiment will be described. In the third embodiment, configurations and operations that are the same as those of the first or second embodiments are denoted by the same numbers and redundant descriptions are omitted.

The image determination method according to the third embodiment is an example of the case where there is not only a narrow environment such as a corridor. The configuration of the image determination device according to the third embodiment is the same as that of the image determination device 20 according to the first and second embodiments. Furthermore, the main flow of the image determination processing according to the third embodiment is the same as that of the first embodiment and the second embodiment and is indicated in the flowchart depicted in FIG. 11. In the third embodiment, the configuration of the person information table is different from those of the first embodiment and the second embodiment. The overall color information and the contour color information are the same as in the first embodiment, for example.

FIG. 18 is a drawing depicting an example of a person information table according to the third embodiment. As depicted in FIG. 18, a person information table 280 according to the third embodiment is a data table in which information of people detected from images acquired by the processing device 30 is collected. The person information table 280 includes a person ID, an imaging device ID, an appearance time, a disappearance time, a movement direction, feature values (color information), movement route information, and a corresponding person, for a person detected in a plurality of images captured in a time-sequential manner by the imaging devices 50.

The person information table 280 according to the third embodiment is different from the person information table 120 according to the first embodiment in that color information corresponding to the orientation of a person is included as feature values. The person information table 280 includes respective overall color information and contour color information in accordance with the orientation (each prescribed angle, for example) of a person.

FIG. 19 is a drawing describing an example of a same person determination method according to the third embodiment. As depicted in FIG. 19, it is assumed that the imaging device 50-1 and the imaging device 50-2 are capturing mutually different imaging ranges. At such time, the person detection/tracking unit 32 detects that a person 285 has moved along a movement locus 287 within the imaging range of the imaging device 50-1, and has moved along a movement locus 289 within the imaging range of the imaging device 50-2. Color information on the movement locus 287 is extracted from a normalized image by the silhouette extraction unit 36 and the color information extraction unit 38. The color information may be extracted when a prescribed orientation is detected, at each 15°, for example.

The person orientation determination unit 40 determines that the person 285 has been captured on the movement locus 287 at orientations of 0°, 30°, and 45° as the orientations described in FIG. 7. Furthermore, the person orientation determination unit 40 determines that the person 285 has been captured on the movement locus 289 at orientations of 195° and 210°.

The same person determination unit 42 refers to the person information table 280 to, in this example, determine whether the people are the same person, based on the color information at each orientation of 0°, 30°, 45°, 195°, and 210°. Contour color information 291 to 299 is extracted as color information, for example.

Figure 20:
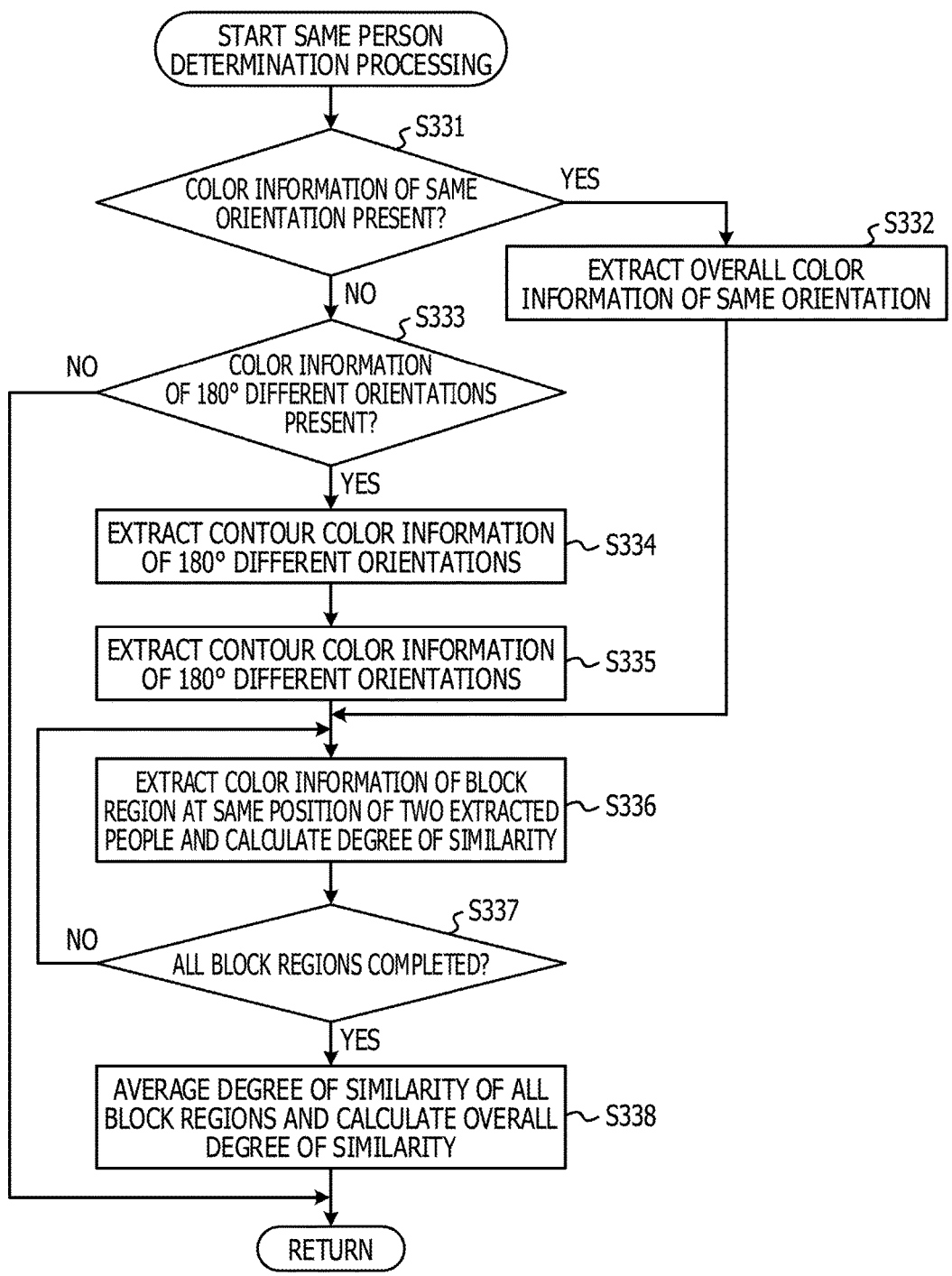
FIG. 20 is a flowchart depicting an example of a same person determination procedure according to the third embodiment.

FIG. 20 is a flowchart depicting an example of a same person determination procedure according to the third embodiment. The person determination processing is the processing of S169 of FIG. 11. As depicted in FIG. 20, the same person determination unit 42 determines whether there is color information of the same direction in the color information of the two people extracted in S168 (S331). If the same direction (S331: yes), the same person determination unit 42 refers to and extracts the overall color information of each person in the person information table person information table 280 (S332).

If there is no color information indicating that the orientations of the two people extracted in S168 is the same direction (S331: no), it is determined whether there is color information indicating that the orientations of the two people extracted in S168 is different by 180° (S333). In the case where there is no color information indicating a difference of 180° (S333: no), processing returns to S169 of FIG. 11.

In the case where there is color information indicating that the orientations of the two people are different by 180° (S333: yes), the same person determination unit 42 extracts contour color information of orientations that are different by 180° from the person information table 280 (S334). The same person determination unit 42 inverts one of the items of color information of the two people in a left-right manner (S335). For example, in a state such as that depicted in FIG. 19, there is no data of the same direction, but there is data of directions that are different by 180° in color information 299 of a 210° orientation and color information 293 of 30°, and therefore contour color information is used to perform a same person determination.

The same person determination unit 42 extracts color information of block regions in the same position of the two extracted people to calculate a degree of similarity (S336). More specifically, the same person determination unit 42 obtains a degree of similarity from a color distance in RGB space for each block in the same position of the color information of the two people. The same person determination unit 42 repeats the processing of S336 until the calculation of a degree of similarity is completed for all of the block regions (S337: no), and when completed (S337: yes), averages the degrees of similarity of all of the blocks to calculate a degree of similarity for the whole of the two people (S338).

As described in detail hereinabove, according to the image determination processing of the third embodiment, the processing device 30 detects the orientations of people, and extracts color information corresponding to a plurality of orientations. If the orientations are the same, the processing device 30 uses overall color information to determine whether the two people are the same person. In the case where there is no color information of the same orientation, the processing device 30 extracts information of orientations that are different by 180°, and uses contour color information to determine whether the two people are the same person.

Note that, also in the third embodiment, in the case where there are a plurality of people who are comparison targets, it is preferable that a degree of similarity with all of the people be calculated, and the person having the highest degree of similarity from thereamong be obtained. It is then determined that the selected person is the same person in the case where the degree of similarity of the selected person is equal to or greater than a threshold value, and the same person determination unit 42 stores the person ID of that person as the person ID of corresponding person of the newly registered person. In the case where the degree of similarity is less than the threshold value, it is determined that the selected person is not the same person, and new information is stored.

As described hereinabove, according to the image determination processing of the third embodiment, the orientation of a person is detected and color information corresponding to the orientation is extracted even in situations other than when a person is facing the front or facing the rear such as in the case of a corridor. By extracting color information corresponding to the orientation, color information of the same orientation or orientations that are different by 180° is used for it to be possible to determine whether the people are the same person. Thus, in addition to the effect brought about by the first or second embodiment, there is an effect in that the application scope of the image determination processing broadens.

Note that the present disclosure is not restricted to the embodiments described hereinabove, and various configurations or embodiments may be adopted without deviating from the gist of the present disclosure. For example, the configuration example of the image determination device 20 is exemplary and is not restricted to the described example. The functions of the units described in the processing device 30, for example, may be implemented as a single function that includes a plurality of functions, and conversely may be implemented as a plurality of functions that are divided in a detailed manner. The processing sequences described in the flowcharts are exemplary and are not restricted to the described examples. The method for calculating a degree of similarity in which a weighting corresponding to the distance from the contour is applied as described in the second embodiment may be used instead of calculating a degree of similarity according to contour color information as in the third embodiment.

Figure 21:
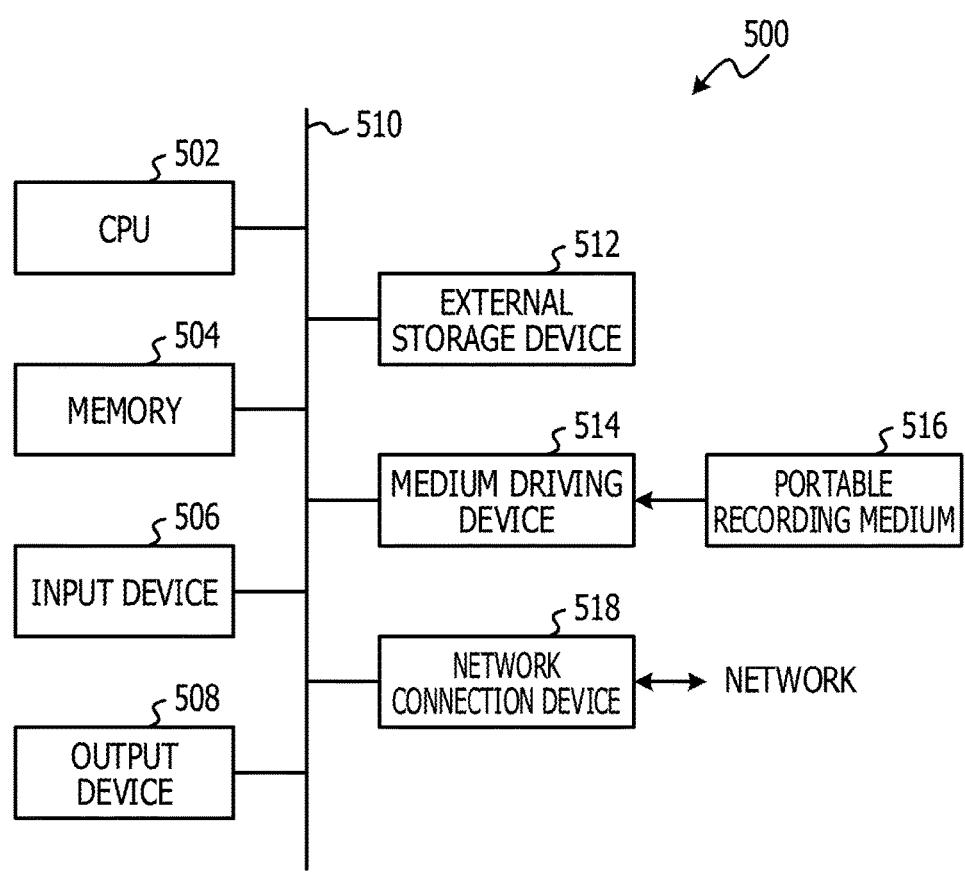
FIG. 21 is a block diagram depicting an example of a typical computer hardware configuration.

Here, a description will be given regarding an example of a computer that is applied in common in order to cause a computer to perform the operations of the image determination methods according to the first to third embodiments. FIG. 21 is a block diagram depicting an example of a typical computer hardware configuration. As depicted in FIG. 21, in a computer 500, a central processing unit (CPU) 502, a memory 504, an input device 506, an output device 508, an external storage device 512, a medium driving device 514, a network connection device 518, and the like are connected via a bus 510.

The CPU 502 is an arithmetic processing device that controls all of the operations of the computer 500. The memory 504 is a storage unit for storing, in advance, a program that controls the operation of the computer 500, and for use as a work area as occasion calls when the program is executed. The memory 504 is a RAM, a read only memory (ROM), or the like. The input device 506 is a device that, when operated by the user of the computer, acquires input of various information from the user that is associated with the content of that operation, and sends the acquired input information to the CPU 502, and is a keyboard device, a mouse device, or the like. The output device 508 is a device that outputs a processing result produced by the computer 500, including a display device or the like. The display device, for example, displays text and images according to display data sent by the CPU 502.

The external storage device 512 is a storage device such as a hard disk, and is a device that stores various control programs executed by the CPU 502, acquired data, and the like. The medium driving device 514 is a device for writing and reading with respect to a portable recording medium 516. The CPU 502 is also able to perform various control processing by reading and executing predetermined control programs recorded on the portable recording medium 516, via the medium driving device 514. The portable recording medium 516 is a compact disc (CD)-ROM, a digital versatile disc (DVD), a Universal Serial Bus (USB) memory, or the like. The network connection device 518 is an interface device that manages the transfer of various data performed with the outside in a wired or wireless manner. The bus 510 is a communication route that is mutually connected to the aforementioned devices, through which data is exchanged.

A program for causing the computer to execute the image determination methods according to the first to third embodiments is stored in the external storage device 512, for example. The CPU 502 reads the program from the external storage device 512, and uses the memory 504 to execute the program, thereby performing an image determination operation. At such time, first, a control program for causing the CPU 502 to perform image determination processing is created and stored in the external storage device 512. A prescribed instruction is then passed from the input device 506 to the CPU 502, and the control program is read out from the external storage device 512 and executed. Furthermore, this program may be stored in the portable recording medium 516.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A determination device comprising:
   a memory; and
   a processor coupled to the memory and the processor configured to:
      extract, from a first image that includes an image of a first person, a first contour area of the image of the first person, the first contour area comprising, within the first image, a boundary between the image of the first person and a background image that does not include the first person, wherein the first contour area does not include a first inner area of the image of the first person,
      extract, from a second image that includes an image of a second person, a second contour area of the image of the second person, the second contour area comprising, within the second image, a boundary between the image of the second person and a background image that does not include the second person, wherein the second contour area does not include a second inner area of the image of the second person,
      specify a first feature value and a second feature value based on the first contour area and the second contour area respectively, and
      determine whether the first person is identified with the second person based on a result of a comparison of the first feature value and the second feature value.

2. The determination device according to claim 1, wherein the first feature value is corresponding to color information of the first contour area and the second feature value is corresponding to color information of the second contour area.

3. The determination device according to claim 1, wherein the first inner area is determined based on a difference in color information corresponding to the first contour area and color information corresponding to the image of the first person that does not include the first contour area, and
   the second inner area is determined based on a difference in color information corresponding to the second contour area and color information corresponding to the image of the second person that does not include the second contour area.

4. The determination device according to claim 1, wherein the processor is configured to:
   detect a first orientation of the first person and a second orientation of the second person, and
   perform the comparison when the first orientation and the second orientation do not match.

5. A determination method by a computer, the determination method comprising:
   extracting, from a first image that includes an image of a first person, a first contour area of the image of the first person, the first contour area comprising, within the first image, a boundary between the image of the first person and a background image that does not include the first person, wherein the first contour area does not include a first inner area of the image of the first person;
   extracting, from a second image that includes an image of a second person, a second contour area of the image of the second person, the second contour area comprising, within the second image, a boundary between the image of the second person and a background image that does not include the second person, wherein the second contour area does not include a second inner area of the image of the second person;
   specify a first feature value and a second feature value based on the first contour area and the second contour area respectively; and
   determining whether the first person is identified with the second person based on a result of a comparison of the first feature value and the second feature value.

6. The determination method according to claim 5, wherein the first feature value is corresponding to color information of the first contour area and the second feature value is corresponding to color information of the second contour area.

7. The determination method according to claim 5, wherein the first inner area is determined based on a difference in color information corresponding to the first contour area and color information corresponding to the image of the first person that does not include the first contour area, and
   the second inner area is determined based on a difference in color information corresponding to the second contour area and color information corresponding to the image of the second person that does not include the second contour area.

8. The determination method according to claim 5, further comprising:
   detecting a first orientation of the first person and a second orientation of the second person; and
   performing the comparison when the first orientation and the second orientation do not match.

* * * * *